(12) United States Patent
Nonoyama et al.

(10) Patent No.: US 11,170,580 B2
(45) Date of Patent: Nov. 9, 2021

(54) INFORMATION PROCESSING DEVICE, INFORMATION PROCESSING METHOD, AND RECORDING MEDIUM

(71) Applicant: SONY CORPORATION, Tokyo (JP)

(72) Inventors: Yo Nonoyama, Kanagawa (JP); Emily Rei Worung, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/474,407

(22) PCT Filed: Jan. 25, 2018

(86) PCT No.: PCT/JP2018/002198
§ 371 (c)(1),
(2) Date: Jun. 27, 2019

(87) PCT Pub. No.: WO2018/150831
PCT Pub. Date: Aug. 23, 2018

(65) Prior Publication Data
US 2020/0258314 A1    Aug. 13, 2020

(30) Foreign Application Priority Data
Feb. 16, 2017  (JP) ............................. JP2017-027238

(51) Int. Cl.
*G06T 19/20* (2011.01)
*G06F 3/01* (2006.01)
*G06K 9/00* (2006.01)
(52) U.S. Cl.
CPC .............. *G06T 19/20* (2013.01); *G06F 3/011* (2013.01); *G06F 3/013* (2013.01); *G06F 3/016* (2013.01); *G06K 9/00355* (2013.01); *G06K 9/00362* (2013.01); *G06T 2219/2016* (2013.01)

(58) Field of Classification Search
CPC ...... G06K 9/00355; G06F 3/011; G06T 19/00
See application file for complete search history.

(56) References Cited

U.S. PATENT DOCUMENTS

| | | |
|---|---|---|
| 2015/0347080 A1 | 12/2015 | Shin et al. |
| 2016/0054797 A1 | 2/2016 | Tokubo et al. |
| 2016/0054798 A1 | 2/2016 | Messingher et al. |
| 2016/0224123 A1* | 8/2016 | Antoniac ............... G06F 3/017 |

(Continued)

FOREIGN PATENT DOCUMENTS

| | | |
|---|---|---|
| CN | 106255940 A | 12/2016 |
| CN | 106415510 A | 2/2017 |

(Continued)

OTHER PUBLICATIONS

International Search Report and Written Opinion of PCT Application No. P CT/JP2018/002198, dated Apr. 10, 2018, 09 pages of ISRWO.

*Primary Examiner* — Matthew Salvucci
(74) *Attorney, Agent, or Firm* — Chip Law Group

(57) ABSTRACT

Provided is an information processing device including a recognition unit that recognizes a manipulation of a user wearing a display device, and an output control unit that controls, while causing the display device to display a screen including a captured image of an observation target, a size of the observation target in the screen, on the basis of a distance between a recognition target that the user manipulates and a criterial position.

20 Claims, 24 Drawing Sheets

(56) References Cited

U.S. PATENT DOCUMENTS

| | | | |
|---|---|---|---|
| 2016/0239080 A1* | 8/2016 | Margolina | G06T 19/20 |
| 2016/0259408 A1 | 9/2016 | Messingher et al. | |
| 2017/0038838 A1 | 2/2017 | Kato et al. | |
| 2017/0243453 A1* | 8/2017 | Birnbaum | G06F 1/163 |
| 2018/0136466 A1* | 5/2018 | Ko | G02B 27/0172 |
| 2018/0349690 A1* | 12/2018 | Rhee | G06F 3/04815 |

FOREIGN PATENT DOCUMENTS

| | | |
|---|---|---|
| CN | 106575159 A | 4/2017 |
| CN | 107368183 A | 11/2017 |
| EP | 3144775 A1 | 3/2017 |
| EP | 3149598 A1 | 4/2017 |
| EP | 3183633 A1 | 6/2017 |
| EP | 3183634 A1 | 6/2017 |
| JP | 2003-308141 A | 10/2003 |
| JP | 2017-530452 A | 10/2017 |
| KR | 10-2015-0137828 A | 12/2015 |
| KR | 10-2017-0005406 A | 1/2017 |
| WO | 2014/162852 A1 | 10/2014 |
| WO | 2015/170520 A1 | 11/2015 |
| WO | 2015/183033 A1 | 12/2015 |
| WO | 2016/029180 A1 | 2/2016 |
| WO | 2016/029183 A1 | 2/2016 |
| WO | 2016/136838 A1 | 9/2016 |

\* cited by examiner

FIG. 7
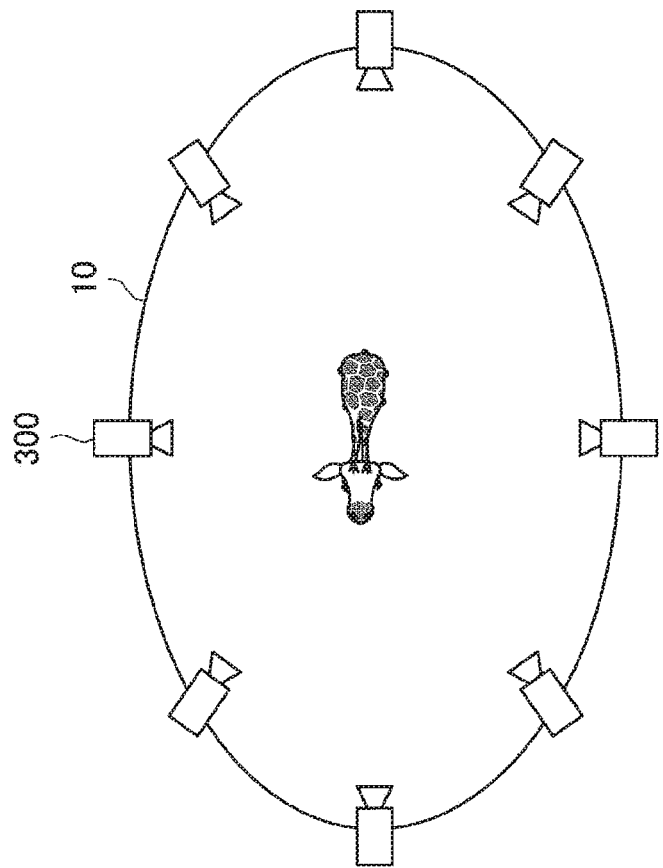
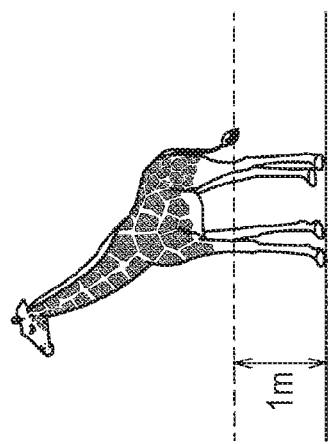

FIG. 9
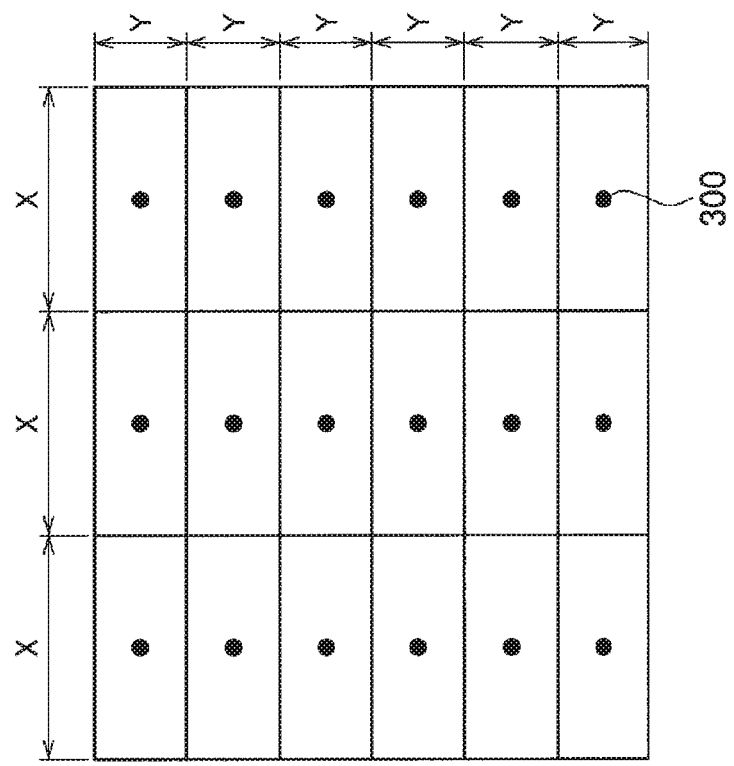
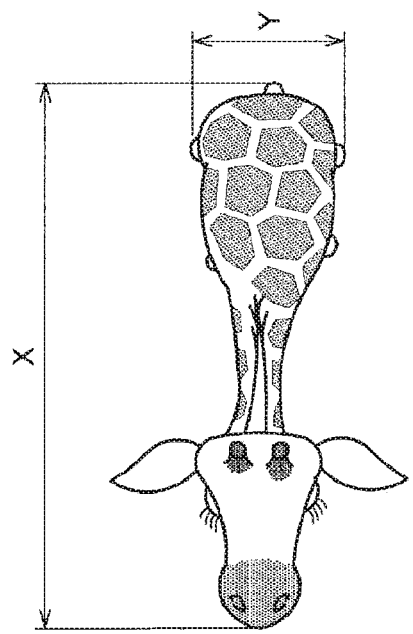

FIG. 23
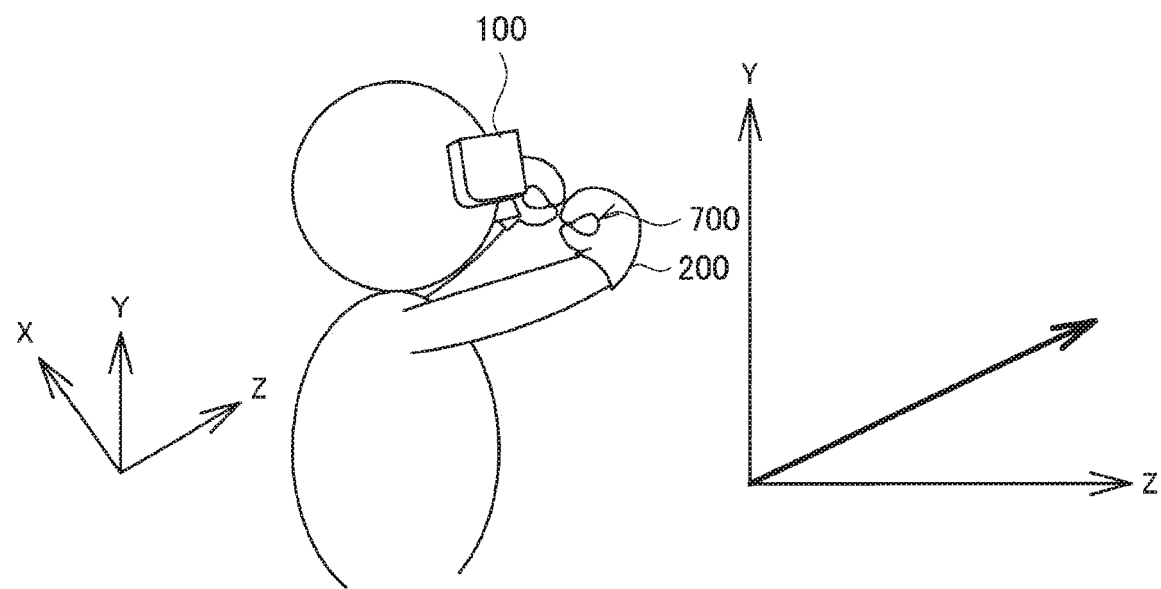
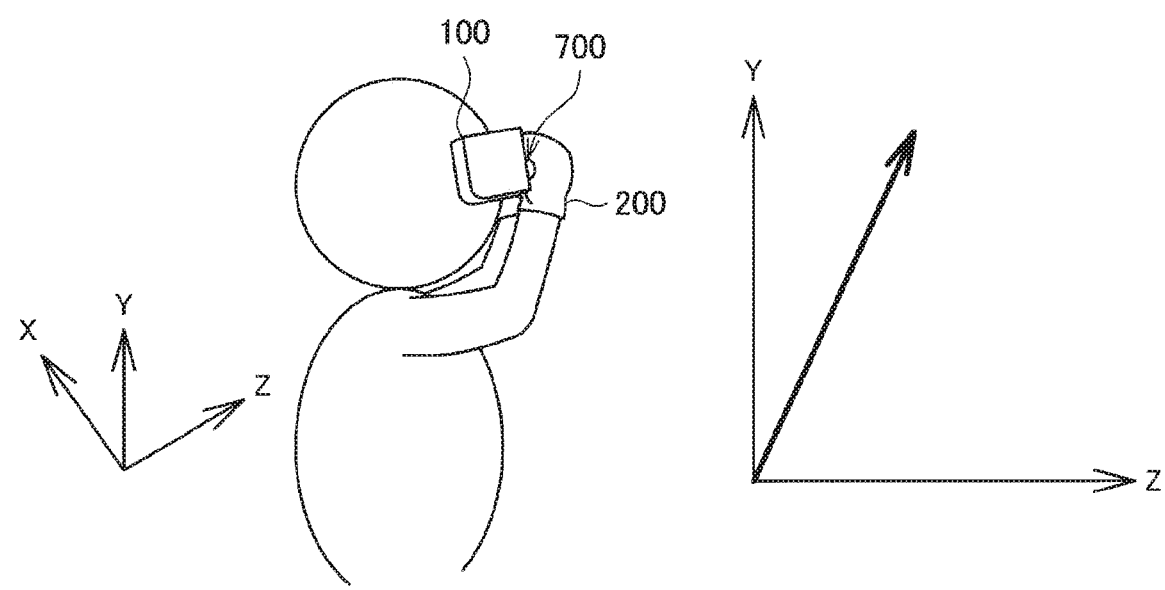

INFORMATION PROCESSING DEVICE, INFORMATION PROCESSING METHOD, AND RECORDING MEDIUM

CROSS REFERENCE TO RELATED APPLICATIONS

This application is a U.S. National Phase of International Patent Application No. PCT/JP2018/02198 filed on Jan. 25, 2018, which claims priority benefit of Japanese Patent Application No. JP 2017-027238 filed in the Japan Patent Office on Feb. 16, 2017. Each of the above-referenced applications is hereby incorporated herein by reference in its entirety.

TECHNICAL FIELD

The present disclosure relates to an information processing device, an information processing method, and a recording medium.

BACKGROUND ART

In the recent technological development, there is a trend toward improvement of hardware or software in performance, whereas there is a trend toward provision of richer user experience. Examples of a technology for providing rich user experience include a technology of presenting a user with additional information in superimposition on real space, referred to as augmented reality (AR) and a technology of providing a user with virtual space in construction, referred to as virtual reality (VR). In these technologies, technological development has been carried out for provision of richer user experience, from various viewpoints, such as improvement of the sense of immersion of a user and improvement of usability in virtual space.

For example, Patent Document 1 discloses a technology of changing zooming and the position of a visual point in virtual space.

CITATION LIST

Patent Document

Patent Document 1: International Publication No. 2014/162852

SUMMARY OF THE INVENTION

Problems to be Solved by the Invention

However, it is hard to say that the technology proposed, for example, in Patent Document 1 is sufficient as a technology for provision of rich user experience, because it has not been long since the development. For example, similarly, a technology of smoothly controlling the sense of distance to a target in virtual space, is not sufficient as the technology.

Thus, an object of the present disclosure is to propose a mechanism enabling smooth control of the sense of distance to a target in virtual space.

Solutions to Problems

According to the present disclosure, provided is an information processing device including: a recognition unit configured to recognize a manipulation of a user wearing a display device; and an output control unit configured to control, while causing the display device to display a screen including a captured image of an observation target, a size of the observation target in the screen, on the basis of a distance between a recognition target that the user manipulates and a criterial position.

Furthermore, according to the present disclosure, provided is an information processing method to be performed by a processor, the information processing method including: recognizing a manipulation of a user wearing a display device; and controlling, while causing the display device to display a screen including a captured image of an observation target, a size of the observation target in the screen, on the basis of a distance between a recognition target that the user manipulates and a criterial position.

Furthermore, according to the present disclosure, provided is a recording medium storing a program for causing a computer to function as: a recognition unit configured to recognize a manipulation of a user wearing a display device; and an output control unit configured to control, while causing the display device to display a screen including a captured image of an observation target, a size of the observation target in the screen, on the basis of a distance between a recognition target that the user manipulates and a criterial position.

According to the present disclosure, a screen including a real-time captured image of an observation target, is displayed in a display device. Then, the size of the observation target in the screen is controlled on the basis of the distance between a recognition target that a user wearing the display device manipulates and a criterial position. The user manipulates the recognition target and changes the distance to the criterial position, so that the size of the observation target in the screen can be easily changed. In this manner, smooth control of the sense of distance to the target in virtual space, is achieved.

Effects of the Invention

According to the present disclosure as described above, provided is a mechanism enabling smooth control of the sense of distance to a target in virtual space. Note that the effect is not necessarily limitative and thus any effect described in the present specification or other effects that can be grasped from the present specification may be provided in addition to the effect or instead of the effect.

BRIEF DESCRIPTION OF DRAWINGS

FIG. 7 is an illustration of exemplary installation of observation devices that each observe an observation target at a side angle.

FIG. 9 is an illustration of exemplary installation of observation devices that each observe an observation target at a bottom angle.

FIG. 23 is an illustration for describing an exemplary zoom manipulation according to the present embodiment.

MODE FOR CARRYING OUT THE INVENTION

A preferred embodiment of the present disclosure will be described in detail below with reference to the attached drawings. Note that, in the present specification and the drawings, constituent elements having substantially the same functional configurations, are denoted with the same reference signs, and thus the duplicate descriptions thereof will be omitted.

Note that the descriptions will be given in the following order:
1. Overview
2. Exemplary Configuration of Each Device
2.1. Exemplary Configuration of Display Device
2.2. Exemplary Configuration of Output Device
2.3. Exemplary Configuration of Observation Device
3. Flow of Processing
4. Detail of Each Piece of Processing
4.1. Display of Initial Screen
4.2. Display of Selection Screen
4.3. Display of Observation Screen
4.4. User Manipulation
4.5. Inter-User Interaction
5. Exemplary Hardware Configuration
6. Summary <<1. Overview>>

First, the overview of a system according to an embodiment of the present disclosure, will be described with reference to FIG. 1.

Figure 1:
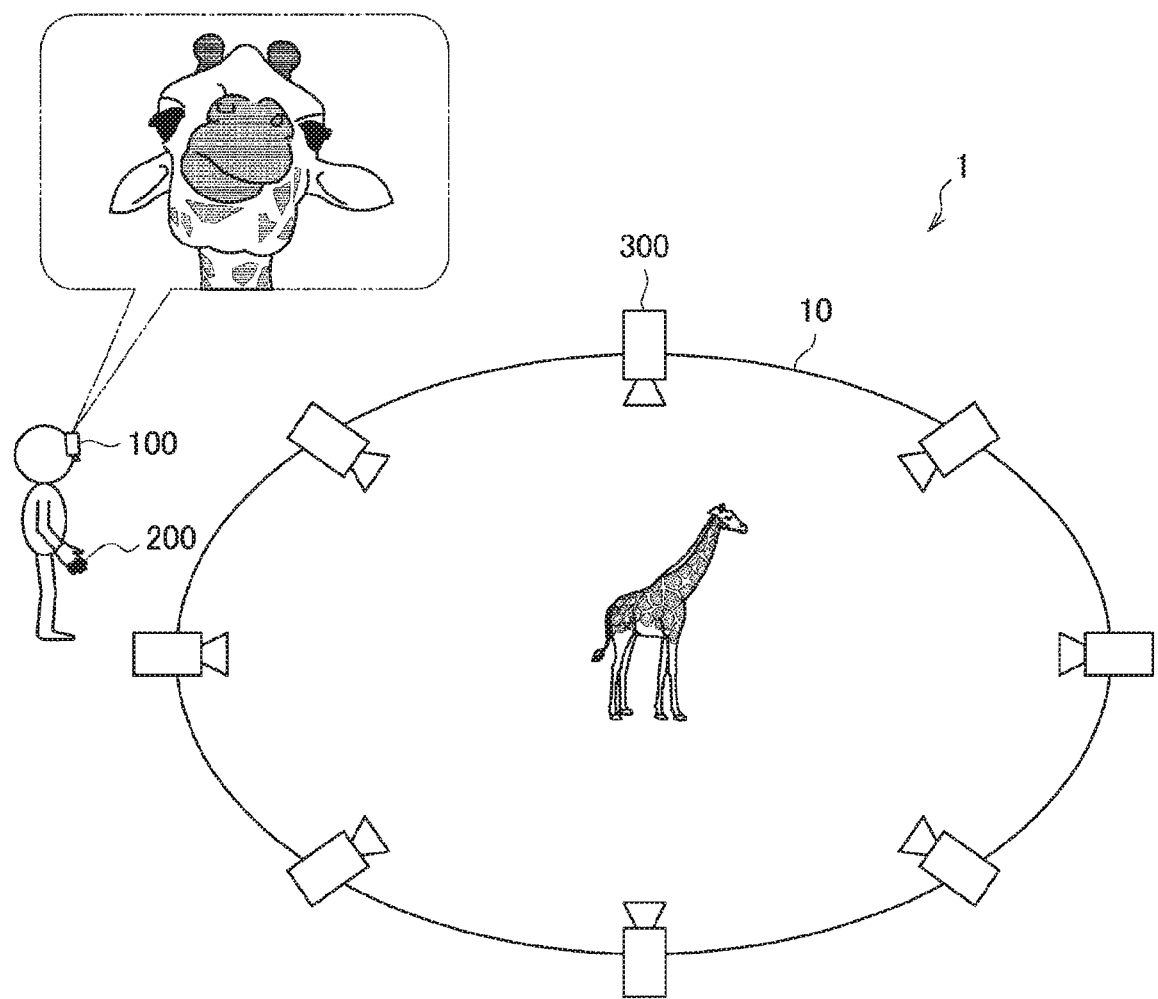
FIG. 1 is an illustration of the entire configuration of a system according to the present embodiment.

FIG. 1 is an illustration of the entire configuration of the system according to the present embodiment. As illustrated in FIG. 1, the system 1 according to the present embodiment includes a display device 100, an output device 200, and a plurality of observation devices 300.

The observation devices 300 are each a device that observes an observation target. For example, the observation devices 300 each acquire observation information, such as a captured image (moving image/still image) and a sound of the observation target. The observation devices 300 each capable of performing, for example, capturing with zooming and sound pickup with formation of microphone directivity, can acquire the observation information as if the observation target had been observed nearby. Note that the zooming is defined as a general term for zooming-in and zooming-out.

The display device 100 and the output device 200 each output information based on an observed result by each observation device. For example, the display device 100 worn on a user, displays the image captured by an observation device 300. The display device 100 may further output a sound picked up by the observation device 300. The output device 200 virtually generates and outputs feels, such as heartbeat, body temperature, and the lie of hair, acquired at the touch of the observation target, for example. This arrangement enables the user to enjoy user experience with realistic feeling as if the user has come close to and touched the observation target even when apart from the observation target. Note that the user indicates a person wearing the display device 100.

In the present specification, as illustrated in FIG. 1, the system 1 managed in a zoo will be described. As illustrated in FIG. 1, the observation devices 300 that are large in number, are installed along a fence 10 surrounding an animal that is the observation target. Not illustrated, each observation device 300 may be installed on the ground inside the fence 10, may be installed in midair inside the fence 10, or may be mounted on a drone that flies around the animal. In the example illustrated in FIG. 1, the display device 100 displays in real time the image captured by the observation device 300 installed in front of the animal. The user can enjoy user experience as if the user has watched the animal nearby from the front, without moving in front of the animal and without coming close to the fence 10.

In the zoo, the user has difficulty in watching an impressive view due to, for example, the animal is located apart from the user or hides behind an obstacle, such as a rock. Furthermore, the user needs to move along the fence 10 in order to watch the animal at various angles or has difficulty in watching the animal satisfactorily due to the hindrance of a crowd around the fence 10.

In this respect, the system 1 enables the user to enjoy, for example, an image, a sound, and a feel that are impressive, acquired by an observation device 300 installed near the animal even in a case where the animal is located apart or hides behind an obstacle. Furthermore, the user can multi-directionally watch the animal from various visual points upward, downward, left, and right, without moving around or without the hindrance of a crowd.

The overview of the system 1 has been described above.

<<2. Exemplary Configuration of Each Device>>

Exemplary configuration of each device included in the system 1, will be described below with reference to FIGS. 1 to 9.

<2.1. Exemplary Configuration of Display Device>>

(1) Exemplary External Configuration

Figure 2:
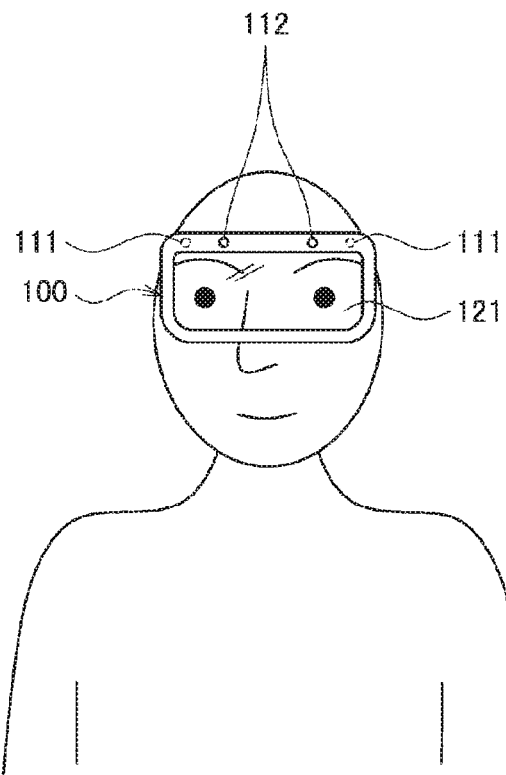
FIG. 2 is an illustration of an exemplary external configuration of a display device according to the present embodiment.

FIG. 2 is an illustration of an exemplary external configuration of the display device 100 according to the present embodiment. The display device 100 illustrated in FIG. 2 is also referred to as a head mounted display (HMD).

The display device 100 including, for example, a wearable unit having a frame structure half round from either side of the head to the back of the head, is put on both auditory capsules for wear on the user, as illustrated in FIG. 2. Then, the display device 100 worn as illustrated in FIG. 2 has a display unit 121 disposed right in front of both eyes of the user. The display unit 121 includes, for example, a liquid crystal panel, and the display device 100 controls the transmittance of the liquid crystal panel, so that a transmissive state, namely, a transparent or translucent state, or a non-transmissive state can be acquired.

Moreover, the display unit 121 in the transmissive state displays an image, such as text or a figure, so that AR information (namely, annotation) can be displayed in superimposition on a scene in real space. Furthermore, the display unit 121 in the non-transmissive state can display a captured image in real space captured by an outward camera 112, and can display annotation in superimposition on the captured image in real space.

On the other hand, the display unit 121 in the non-transmissive state is capable of displaying VR information. For example, the display unit 121 in the non-transmissive state can reproduce and display content received by the display device 100 from external equipment or content stored in a storage medium of the display device 100 (namely, a storage unit 140), or can display annotation in superimposition on the reproduced and displayed content. Note that examples of the external equipment include a server; a digital camera; a digital video camera; an information processing device, such as a mobile-phone terminal, a smartphone, or a personal computer; and the like. According to the present embodiment, the observation devices 300 are provided as the external equipment.

Note that, the entire image that the display unit 121 displays, is also referred to as a screen, below. Here, the screen belongs to a concept including an image displayed in the non-transmissive state and a view appearing transmissively and annotation displayed in superimposition in the transmissive state. Furthermore, each element included in the screen is also referred to as a display object, and the display object belongs to a concept including, for example, annotation.

Furthermore, the display device 100 includes a pair of inward cameras 111 disposed toward the user so as to capture the user at close range with the user wearing the display device 100. The inward cameras 111 function as a first image sensor that captures the eyes of the user. The inward cameras 111 may be a stereo camera capable of acquiring depth information, or may be provided with a depth sensor.

Furthermore, the display device 100 includes the outward camera 112 disposed forward so as to perform capturing in the direction in which the user faces (e.g., the direction in which the user makes visual identification with the display unit 121 in the transmissive state) as a capturing direction, with the user wearing the display device 100. The outward camera 112 functions as a second image sensor that captures a recognition target, such as a hand of the user. The outward camera 112 may be a stereo camera capable of acquiring depth information or may be provided with a depth sensor.

Furthermore, not illustrated in FIG. 2, earphone speakers may be disposed so as to be inserted into both auditory capsules of the user with the user wearing the display device 100. Furthermore, not illustrated in FIG. 2, a microphone may be disposed so as to pick up external sound.

Note that the display device 100 according to the present embodiment may be the HMD illustrated in FIG. 2 or may be a simplified HMD, for example, with fixation of a smartphone in front of the eyes. In that case, the display of the smartphone, an in-camera provided on the display side of the smartphone, and an out-camera provided on the back side of the smartphone function as the display unit 121, the inward cameras 111, and the outward camera 112 described above, respectively. Then, a fixation stand fixing the smartphone includes, for example, a control unit 150, a storage unit 140, and a communication unit 130 to be described later, and acquires a captured image and controls screen display, in communication with the smartphone.

As another example, the display device 100 can be achieved as a smartphone, a tablet terminal, a PC, a digital signage, or the like, instead of the HMD.

The external configuration of the display device 100 has been described above. Next, the internal configuration of the display device 100 will be described.

(2) Exemplary Internal Configuration

Figure 3:
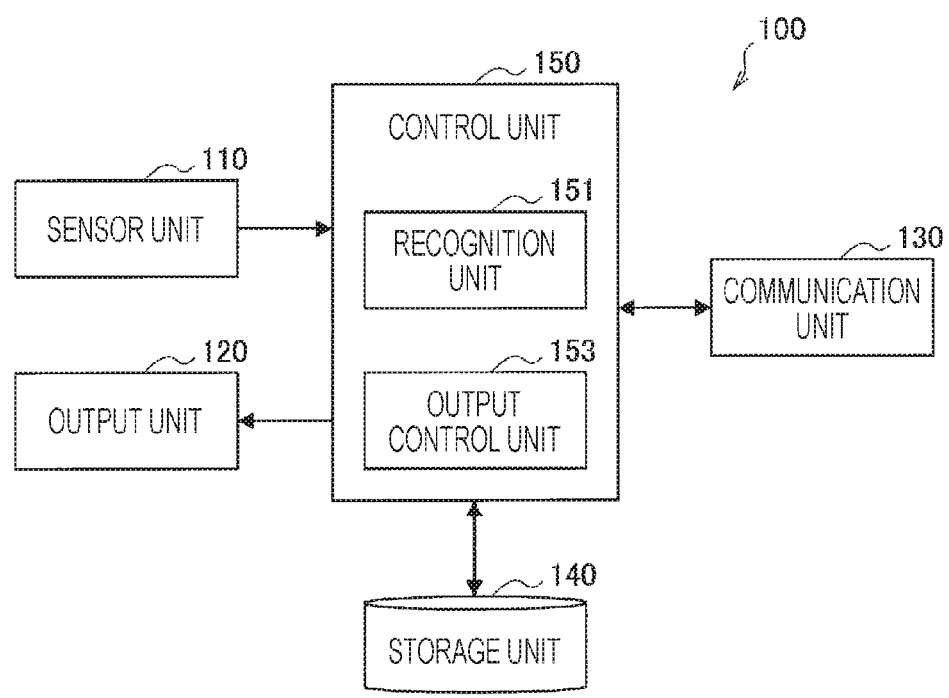
FIG. 3 is a block diagram of an exemplary logical configuration of the display device according to the present embodiment.

FIG. 3 is a block diagram of an exemplary logical configuration of the display device 100 according to the present embodiment. As illustrated in FIG. 3, the display device 100 according to the present embodiment includes a sensor unit 110, an output unit 120, the communication unit 130, the storage unit 140, and the control unit 150.

Sensor Unit 110

The sensor unit 110 acquires sensing information regarding the motion and the state of the user. For example, with the user wearing the display device 100, the sensor unit 110 can include the inward cameras 111 that have the eyes of the user as objects to be captured and the outward camera 112 that performs capturing in the direction in which the user faces as the capturing direction. Furthermore, the sensor unit 110 can include a pressure sensor in contact with a side of the face of the user with the user wearing the display device 100. Furthermore, the sensor unit 110 can include an infrared sensor that acquires the temperature of a target in a contactless manner or a depth sensor that acquires depth information regarding the target. Furthermore, the sensor unit 110 can include a sensor that acquires the attitude of the user, such as a gyroscope sensor or an acceleration sensor. Furthermore, the sensor unit 110 can include a sensor that acquires biological information regarding the user, such as a myoelectric sensor, a pulse sensor, or a body temperature sensor. Furthermore, the sensor unit 110 can include a microphone that picks up the sound of the user. Furthermore, the sensor unit 110 can include a sensor that acquires positional information regarding the user, such as the global positioning system (GPS).

Output Unit 120

The output unit 120 outputs information to the user. For example, the output unit 120 can include the display unit 121 that displays an image. Furthermore, the output unit 120 can include a speaker that outputs sound. Furthermore, the output unit 120 can include a device that outputs a smell, such as an aroma diffuser.

Communication Unit 130

The communication unit 130 communicates with a different device.

For example, the communication unit 130 receives the observation information from an observation device 300. Furthermore, the communication unit 130 transmits tactile information to the output device 200.

Storage Unit 140

The storage unit 140 stores information for the operation of the display device 100, temporarily or permanently.

For example, the storage unit 140 stores various types of tactile information. The tactile information is information imitating the tactile sensation acquired at the touch of the observation target. The observation target may be an animal. In that case, the tactile information may include at least any of the heartbeat, the body temperature, or the feel of the body surface of the observation target. Note that the animal here belongs to a concept including any creature, such as Mammalia, Amphibia, Aves, and Pisces.

For example, the tactile information includes beating data every animal as information regarding heartbeat. The beating data can include, for example, the cycle and the magnitude of beating and the position of the heart.

For example, the tactile information includes temperature data every animal as information regarding body temperature. Preferably, the temperature data includes data every region, such as a trunk and a leg.

For example, the tactile information includes hair-lie data, such as the quantity of hair, the quality of hair, and the direction of hair of the body surface every animal as information regarding the feel of a body surface. Preferably, the hair-lie data includes data every region, such as a trunk and a leg.

Control Unit 150

The control unit 150 provides various functions of the display device 100. The control unit 150 includes a recognition unit 151 and an output control unit 153. Note that the control unit 150 can further include another constituent element other than the constituent elements. In other words, the control unit 150 can perform an operation other than the operations of the constituent elements.

Recognition Unit 151

The recognition unit 151 performs processing of recognizing the manipulation of the user wearing the display device 100.

For example, the recognition unit 151 can recognize the direction of the visual line of the user, on the basis of a captured image or depth information by the inward cameras 111, and can recognize the user manipulation, on the basis of the direction of the visual line. For example, in a case where there is a display object at which the user is gazing, for details, in a case where the visual line of the user remains in a certain range from the display object for a predetermined time, the recognition unit 151 recognizes that the user has selected the display object, as the user manipulation. Note that the certain range indicates the internal area of the display object or an area having a margin of approximately several pixels at each of the top, the bottom, the left, and the right of the area of the display object.

Furthermore, the recognition unit 151 can recognize the focal length of the visual line of the user, and can recognize the user manipulation, on the basis of the focal length. For example, with reference the relationship between the thickness of a crystalline lens and the focal length of the eye, the recognition unit 151 recognizes the focal length, on the basis of the thickness of the crystalline lens. Note that irradiation of an eye with light and observation of scattered light thereof enable recognition of the thickness of the crystalline lens. U.S. Pat. No. 9,131,839 describes such a technology of recognizing a focal length based on the thickness of a crystalline lens, in detail.

On the other hand, the recognition unit 151 can recognize a gesture made by the recognition target, such as a hand of the user, on the basis of a captured image or depth information by the outward camera 112, and can recognize the user manipulation, on the basis of the gesture. For example, on the basis of the captured image and the depth information of a hand raised by the user in front of the eyes, namely, in the capturing range of the outward camera 112, the recognition unit 151 recognizes a hand gesture, such as a shape made by the hand of the user or the stretch and draw of the arm (namely, flexing and stretching), and recognizes the user manipulation corresponding to the hand gesture. Note that, in the present specification, the hand means ranging from the wrist to the fingertips, and the arm means ranging from the shoulder to the wrist.

Moreover, the recognition unit 151 may recognize the user manipulation, on the basis of sensing information sensed by the output device 200. For example, on the basis of attitude information regarding the hand of the user, the recognition unit 151 recognizes a hand gesture, such as a shape made by the hand of the user or the stretch and draw of the arm, and recognizes the user manipulation corresponding to the hand gesture.

In addition, the recognition unit 151 may recognize the user manipulation in consideration of, for example, biological information, the sound of the user, or the attitude of the user.

Output Control Unit 153

The output control unit 153, the output control unit 153 performs processing of controlling output of the display device 100 or the output device 200 to the user.

(Display of Observation Information)

The output control unit 153 generates a screen based on the observation information, and controls the display unit 121 to display the generated screen.

Specifically, the output control unit 153 constructs virtual space and causes display of a screen indicating the state of the virtual space watched from any visual point. The virtual space here is constructed with the captured image captured in real time by each observation device 300, and includes space watched from the visual point of any observation device 300.

The output control unit 153 can cause various display objects to be displayed in superimposition on the screen indicating the virtual space watched from any visual point. Specific examples of the screen to be displayed will be described in detail later.

The output control unit 153 controls the size of the observation target in the screen displayed by the display unit 121. Two types of methods are considered as a method of achieving control of the size of the observation target in the screen. For example, the display device 100 may control the size of the observation target in the screen, with control of the imaging magnification of the captured image. That is, the display device 100 may control the size of the observation target appearing on the screen, with transmission of a zoom-in instruction or a zoom-out instruction, namely, an instruction for zoom ratio to the observation device 300 for optical zooming. Furthermore, the display device 100 may control the size of the observation target in the screen, with control of the display magnification of the captured image with scaling. In other words, the display device 100 may control the size of the observation target appearing on the screen, with digital zooming to the captured image acquired from the observation device 300. The display device 100 may use the optical zooming and the digital zooming in combination. In any case, controlling the size of the observation target in the screen is also referred to as controlling the zoom ratio.

(Output of Tactile Information)

The output control unit 153 provides the tactile information stored in the storage unit 140. For details, the output control unit 153 transmits the tactile information corresponding to the touched region of the observation target to which the user has performed a manipulation for touching in the virtual space displayed by the output unit 120 (hereinafter, also referred to as a contact manipulation), to the output device 200 for output.

Under the environment in which a plurality of observation targets is present as in a zoo, the output control unit 153 first specifies the observation target that is an object to which the user has performed a manipulation for touching. For example, the output control unit 153 may specify the animal of the object, with image recognition of the animals included in the screen displayed by the display unit 121 or sound recognition of the sound included in the observation information that is the source of the screen. Furthermore, the output control unit 153 may specify the animal of the object, with reference to a map including the positions of the visual points in the virtual space and the types of the animals in association, namely, a map including the installed positions of the observation devices 300 and the types of the animals in association. Furthermore, in a case where each animal is mounted with GPS, the output control unit 153 may specify the animal of the object, on the basis of positional information regarding the observation devices 300, the capturing directions of the observation devices 300, and positional information regarding the animals.

The output control unit 153 causes output of the tactile information corresponding to the region touched by the user. For example, the output control unit 153 calculates the distance between the region touched by the user in the virtual space and the position of the heart of the animal of the object, and causes output of beating having a magnitude to which attenuation is added in accordance with the distance. Furthermore, the output control unit 153 causes output of temperature corresponding to the region touched by the user in the virtual space. Furthermore, the output control unit 153 causes output of the feel of a body surface corresponding to the region touched by the user in the virtual space. Note that the output control unit 153 may cause output of the feel varying in accordance with the direction in which the user strokes the animal, so as to realize the lie of hair of the animal.

Moreover, the output control unit 153 may cause the output unit 120 to output a sound and a smell corresponding to the animal and the region touched by the user.

<2.2. Exemplary Configuration of Output Device>

Figure 4:
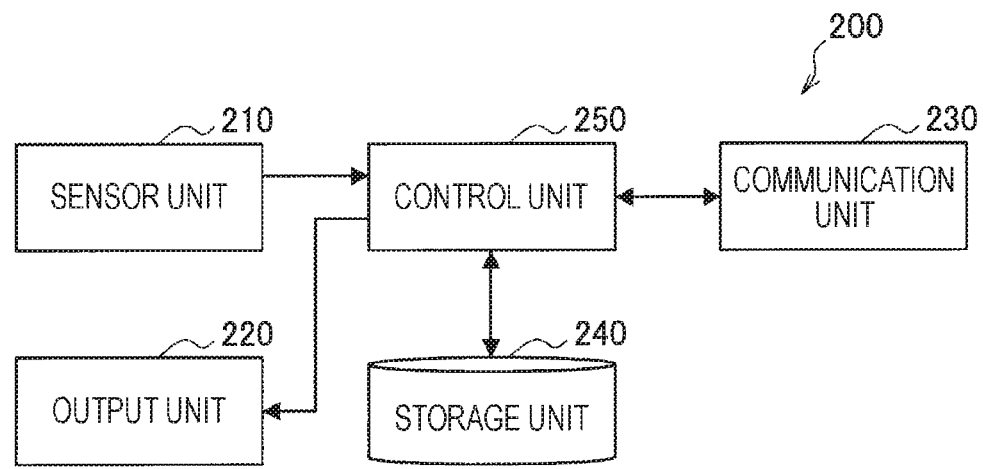
FIG. 4 is a block diagram of an exemplary logical configuration of an output device according to the present embodiment.

FIG. 4 is a block diagram of an exemplary logical configuration of the output device 200 according to the present embodiment. As illustrated in FIG. 4, the output device 200 according to the present embodiment includes a sensor unit 210, an output unit 220, a communication unit 230, a storage unit 240, and a control unit 250. In the following, the output device 200 is achieved as a glove type to be worn on a hand of the user as illustrated in FIG. 1.

Sensor Unit 210

The sensor unit 210 acquires sensing information regarding the motion and the state of the user wearing the output device 200. For example, the sensor unit 210 can include a sensor that acquires the attitude of the hand of the user wearing the output device 200, such as a gyroscope sensor or an acceleration sensor. Furthermore, the sensor unit 210 can include a contact sensor that detects contact between fingers, and can detect a zoom manipulation of the user to be described later, accurately.

Output Unit 220

The output unit 220 outputs the tactile information to the user.

For example, the output unit 220 includes at least any of a vibration generation device, a thermal generation device, or a feel generation device.

For example, the vibration generation device vibrates with the cycle, the magnitude, and the attenuation indicated by the tactile information, to realize the beating of the observation target in a pseudo manner. The vibration generation device may include, for example, a plurality of vibrators, and may vibrate due to a sound wave emitted from an ultrasonic element disposed in the display device 100 or the output device 200.

For example, the thermal generation device generates heat at the temperature indicated by the tactile information, to realize the body temperature of the observation target in a pseudo manner.

For example, the feel generation device generates the feel indicated by the tactile information, to realize the feel of the body surface of the observation target in a pseudo manner. For example, similarly to the vibration generation device in configuration, the feel generation device may realize the feel with vibration in a pseudo manner. Furthermore, the feel generation device may be achieved as an ultrasonic output mechanism provided outside, and may give the feel to the hand of the user with ultrasonic radiation pressure. In that case, the ultrasonic output mechanism can be provided, for example, around the fence in the zoo or on the external face of the display device 100. A feel generation technology with ultrasonic radiation pressure is described in detail, for example, in "T. Iwamoto, T. Maeda, and H. Shinoda: "Focused Ultrasound for Tactile Feeling Display," Proc. 2001 ICAT, pp. 121-126, 2001." In addition, as described in "Yasutoshi Makino and Hiroyuki Shinoda: "A Method to Produce Tactile Sensation Using Suction Pressure", Transactions of the Virtual Reality Society of Japan, Vol. 11, No. 1, pp. 123-132, 2006.", there are various feel generation technologies, such as use of electric stimulation, upward and downward movement of a thin film with pneumatic pressure, and use of suction pressure. Thus, the feel generation device can adopt any technology.

Communication Unit 230

The communication unit 230 communicates with a different device.

For example, the communication unit 230 receives the tactile information from the display device 100. Furthermore, the communication unit 230 transmits the sensing information to the display device 100.

Storage Unit 240

The storage unit 240 stores information for the operation of the output device 200, temporarily or permanently.

Control Unit 250

The control unit 250 provides various functions of the output device 200. For example, the control unit 250 controls the output unit 220 to output the tactile information received from the display device 100.

<2.3. Exemplary Configuration of Observation Device>

(1) Exemplary External Configuration

Figure 5:
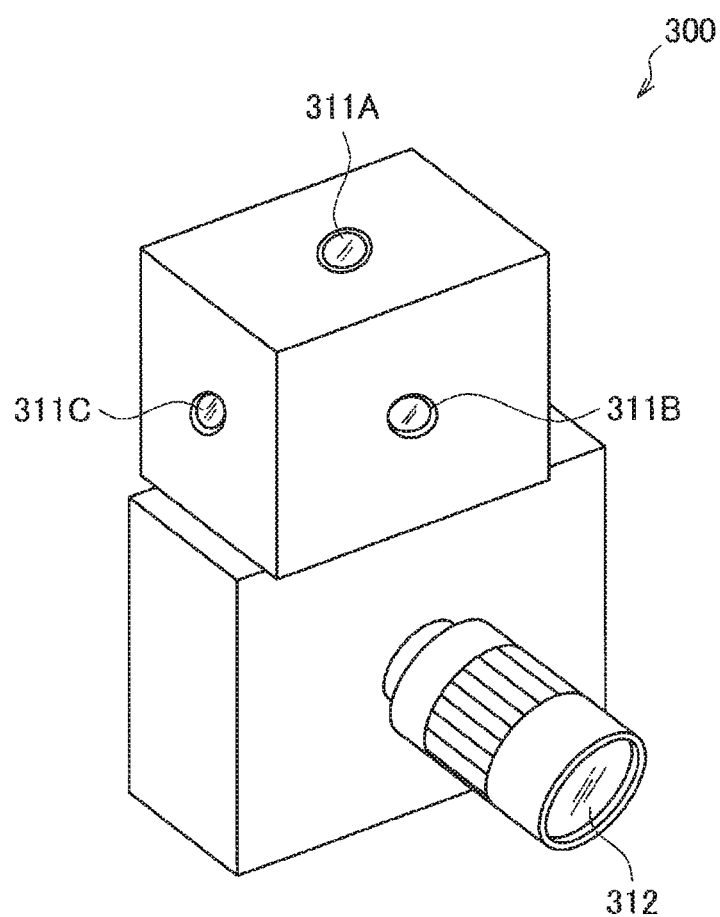
FIG. 5 is an illustration of an exemplary external configuration of an observation device according to the present embodiment.

FIG. 5 is an illustration of an exemplary external configuration of an observation device 300 according to the present embodiment. As illustrated in FIG. 5, the observation device 300 can include a plurality of cameras 311A to 311C and 312. The camera 312 including a zoom lens, is capable of performing capturing with zooming. Note that the cameras 311A to 311C may be different for use from the camera 312. For example, captured images captured by the cameras 311A to 311C may be used to generate a selection screen to be described later, and a captured image captured by the camera 312 may be used to generate an observation screen to be described later.

(2) Exemplary Internal Configuration

Figure 6:
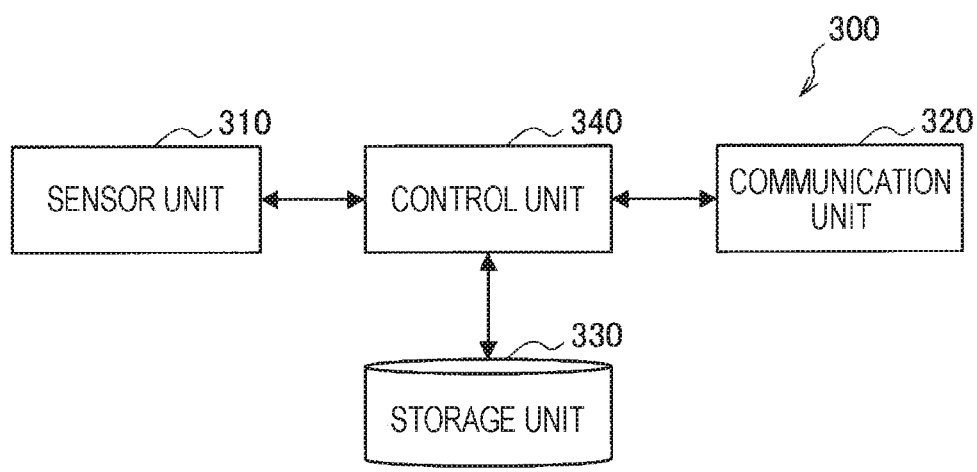
FIG. 6 is a block diagram of an exemplary logical configuration of the observation device according to the present embodiment.

FIG. 6 is a block diagram of an exemplary logical configuration of the observation device 300 according to the present embodiment. As illustrated in FIG. 6, the observation device 300 according to the present embodiment includes a sensor unit 310, a communication unit 320, a storage unit 330, and a control unit 340.

Sensor Unit 310

The sensor unit 310 acquires sensing information regarding the observation target (namely, observation information). The sensor unit 310 acquires the observation information, such as a captured image (moving image/still image) and a sound of the observation target. For example, the sensor unit 310 can include an image sensor, such as the cameras 311A to 311C and 312, a depth sensor, a microphone, and the like. The sensor unit 310 may perform, for example, capturing with zooming and sound pickup with formation of microphone directivity.

Communication Unit 320

The communication unit 320 communicates with a different device.

For example, the communication unit 320 receives a zoom instruction for the image sensor, a formation instruction for microphone directivity, or the like, from the display device 100. Furthermore, the communication unit 320 transmits the observation information to the display device 100.

Storage Unit 330

The storage unit 330 stores information for the operation of the observation device 300, temporarily or permanently.

Control Unit 340

The control unit 340 provides various functions of the observation device 300. For example, the control unit 340 controls the sensor unit 310 to perform zooming or formation of microphone directivity, on the basis of the instruction from the display device 100.

(3) Exemplary Installation

Exemplary installation of observation devices 300 will be described below with reference to FIGS. 7 to 9.

Figure 8:
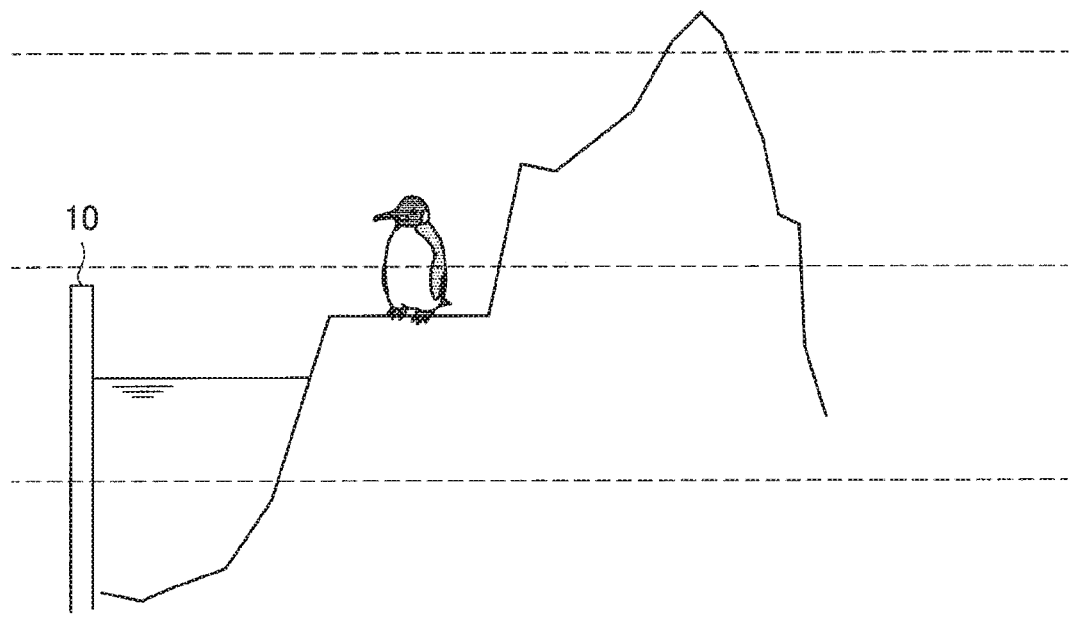
FIG. 8 is an illustration of exemplary installation of observation devices that each observe an observation target at a side angle.

FIGS. 7 and 8 are each an illustration of the exemplary installation of observation devices 300 that each observe the observation target at a side angle (namely, from side). As illustrated in FIG. 7, the observation devices 300 can be installed around the fence 10 in the zoo. The observation devices 300 may be each installed at a height corresponding to the height of the head, the back, or the center of the body of the animal from the ground inside the fence 10. As illustrated in FIG. 7, in a case where the animal inside the fence 10 is a giraffe, the observation devices 300 can be installed so as to capture the animal in eight directions at a height of 1 m. Furthermore, as illustrated in FIG. 8, in a case where there is a difference in height exceeding the stature of the animal at terrain inside the fence 10, the observation devices 300 can be installed so as to capture the animal at the heights of a plurality of stages (three stages in the example illustrated in FIG. 8).

FIG. 9 is an illustration of the exemplary installation of observation devices 300 that each observe the observation target at a bottom angle (namely, from bottom). The observation devices 300 may be installed spreading all over the ground. For example, it is assumed that the animal inside the fence 10 is a giraffe, the distance from the tail to the front end of the face of the giraffe is X in top view, and the width of the body of the giraffe is Y in top view. In that case, as illustrated in FIG. 9, when the ground is segmented into rectangular areas each having a lateral distance of X and a longitudinal distance of Y, the observation devices 300 may be installed into the areas, respectively.

As another example, observation devices 300 may be installed so as to observe the observation target at a top angle (namely, from top). Furthermore, for example, an observation device 300 may be worn on the head of the animal such that the visual-line direction of the animal is identical to the capturing direction.

<<3. Flow of Processing>>

An exemplary flow of user-experience provision processing in the zoo will be described below with reference to FIG. 10.

Figure 10:
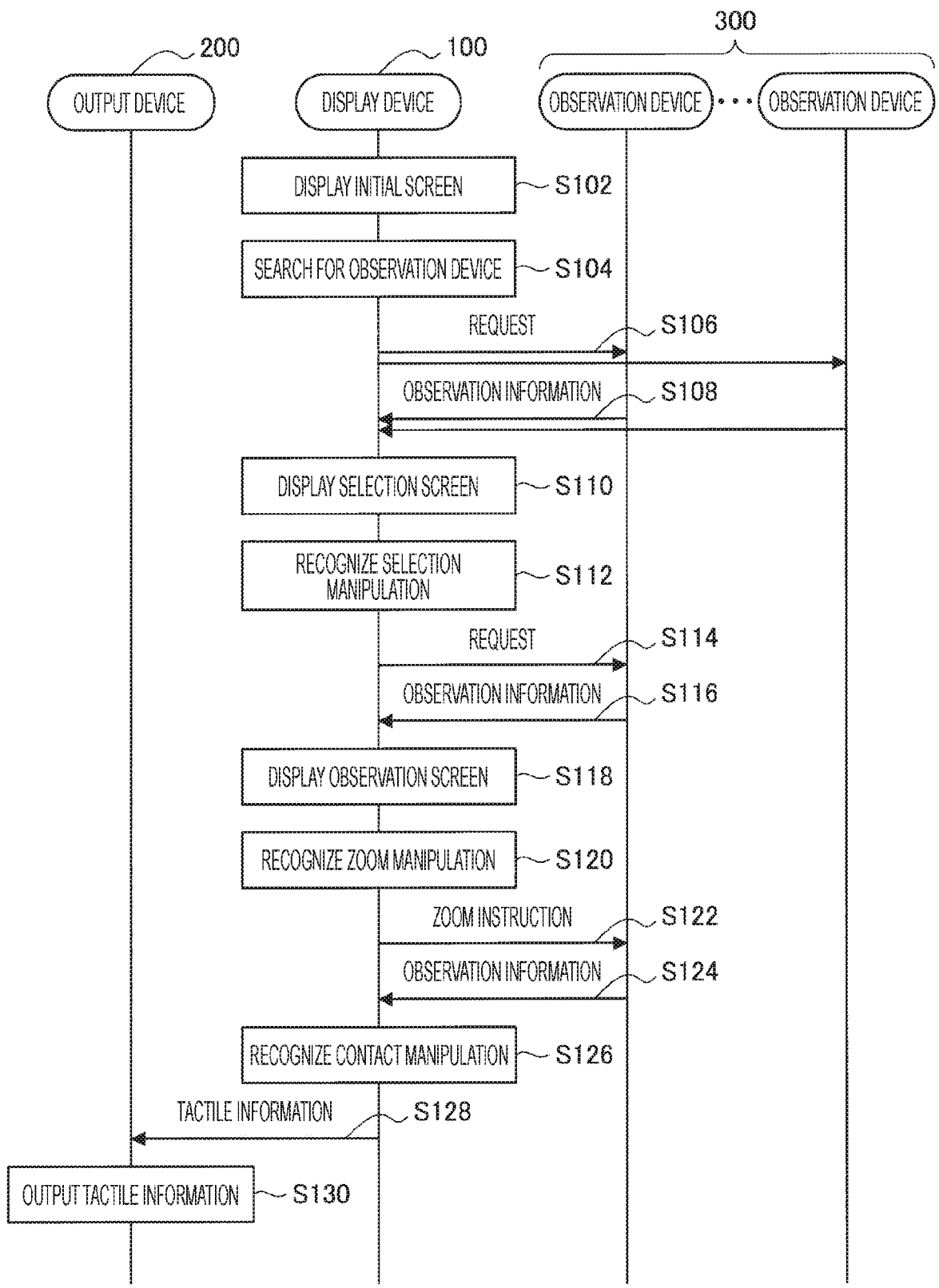
FIG. 10 is an illustration of an exemplary flow of user-experience provision processing to be performed in the system according to the present embodiment.

FIG. 10 is an illustration of the exemplary flow of user-experience provision processing to be performed in the system 1 according to the present embodiment. As illustrated in FIG. 10, the display device 100, the output device 200, and the plurality of observation devices 300 are involved in the present sequence.

First, the display device 100 generates and displays an initial screen (step S102). Because the initial screen will be described later, the detailed description thereof will be omitted here.

Next, the display device 100 searches for an observation device 300 (step S104). For example, on the basis of, for example, the positional information regarding the user and the orientation of the user, the display device 100 searches for an observation device 300 having the animal as the observation target inside the fence 10 before the user's eyes.

Next, the display device 100 transmits a request to the searched observation device 300 (step S106), and the observation device 300 that has received the request transmits the observation information as a reply (step S108).

Next, the display device 100 generates and displays the selection screen, on the basis of the observation information received from the observation device 300 (step S110). The display device 100 recognizes a selection manipulation by the user while displaying the selection screen (S112). For details, the display device 100 recognizes a manipulation of selecting one observation device 300 from the plurality of observation devices 300. Because the selection screen will be described later, the detailed description thereof will be omitted here. Note that, here, the observation screen to be described later is generated, on the basis of the observation information received from the selected observation device 300.

Next, the display device 100 transmits a request to the selected observation device 300 (step S114), and the observation device 300 that has received the request transmits the observation information as a reply (step S116). Note that the observation device 300 may continuously transmit the observation information to the display device 100 after the reception of the request at step S106 above. In that case, the observation device 300 that has received the request at step S114 above, continuously transmits the observation information to the display device 100 after the reception, and the observation devices 300 that have not received the request at step S114 above each stop transmission of the observation information.

Next, the display device 100 generates and displays the observation screen, on the basis of the observation information received from the observation device 300 (step S118). Because the observation screen will be described later, the detailed description thereof will be omitted here.

Next, when recognizing a zoom manipulation by the user (step S120), the display device 100 transmits a zoom instruction to the observation device 300 (step S122). The observation device 300 that has received the zoom instruction, transmits the observation information including the captured image zoomed in or zoomed out on the basis of the zoom instruction, as a reply (step S124). This arrangement causes the observation screen displayed by the display device 100, to be zoomed in or zoomed out.

Next, when recognizing a contact manipulation by the user (step S126), the display device 100 transmits the tactile information corresponding to the recognized contact manipulation, to the output device 200 (step S128).

Then, the output device 200 outputs the received tactile information (step S130).

<<4. Detail of Each Piece of Processing>>

The detail of each piece of processing in the user-experience provision processing described above, will be described below.

<4.1. Display of Initial Screen>

The initial screen is a screen displayed first in the user-experience provision processing. An exemplary initial screen will be described with reference to FIG. 11.

Figure 11:
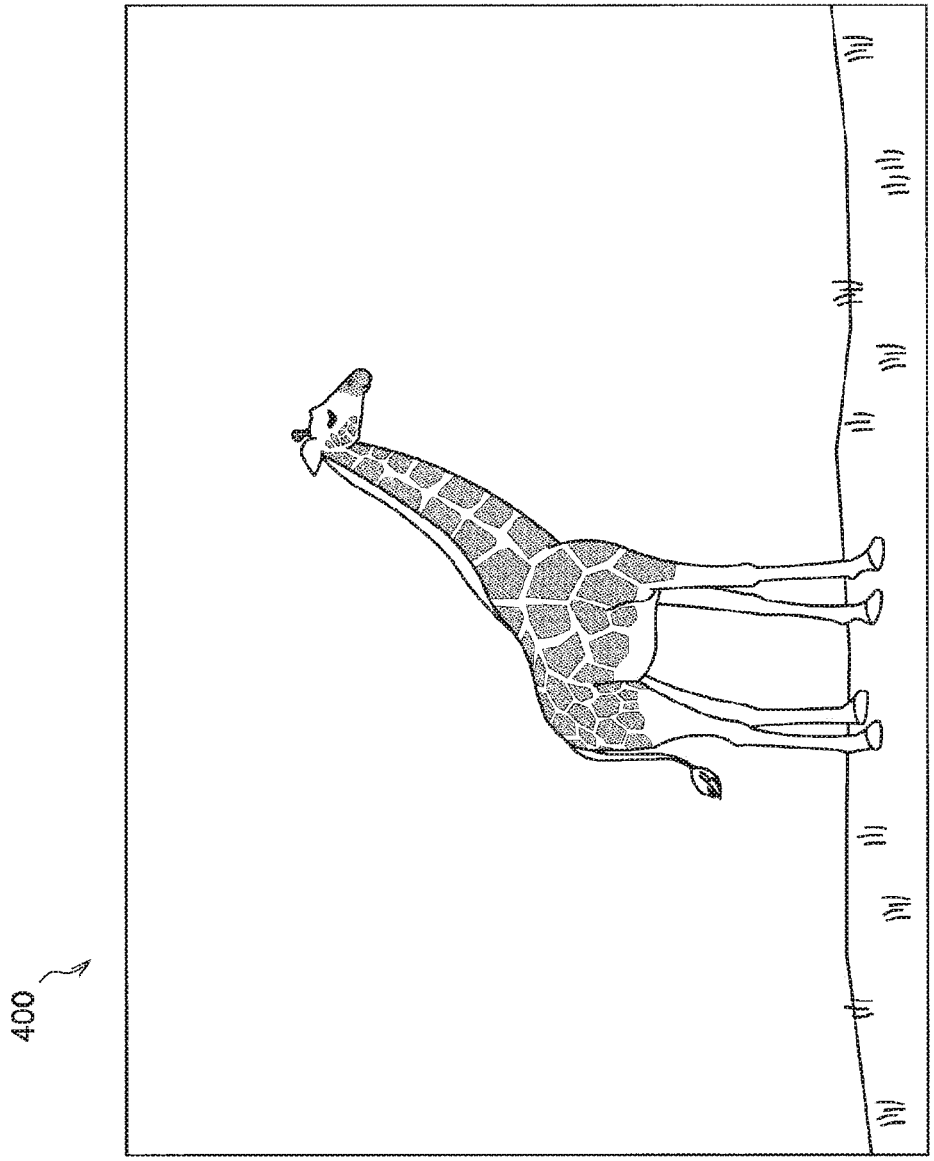
FIG. 11 is an illustration of an exemplary initial screen according to the present embodiment.

FIG. 11 is an illustration of the exemplary initial screen according to the present embodiment. As illustrated in FIG. 11, the initial screen 400 may include a view the same as the view when the user watches the animal directly at the current location. For example, the initial screen 400 may include the captured image captured in real time by the outward camera 112. Furthermore, the initial screen 400 may include a view appearing transmissively with the display unit 121 in the transmissive state.

As another example, the initial screen 400 may include the captured image captured in real time by the observation device 300 selected as default.

<4.2. Display of Selection Screen>

The display device 100 displays the selection screen. The selection screen is a screen allowing selection of an observation device 300 that performs observation processing that is the source of user experience to be provided in the observation screen to be described later.

For details, the display device 100 (e.g., the output control unit 153) displays the selection screen including a plurality of display objects corresponding to a plurality of candidate image capturing devices (namely, observation devices 300) that is likely to be a source of provision of the captured image to be displayed by the display device 100 (namely, the captured image to be provided on the observation screen). Then, the display device 100 (e.g., the recognition unit 151) recognizes a predetermined manipulation of the user to one display object of the plurality of display objects that has been displayed, as the selection manipulation of an observation device 300. On the selection screen, the user can select an observation device 300 as a source of provision of the captured image for observation screen generation, namely, a visual point for observation screen generation.

The selection screen can have various modes. An exemplary selection screen in a camera map mode and an exemplary selection screen in a list display mode will be described below.

Camera Map Mode

In the camera map mode, the display device 100 displays the display objects corresponding to the candidate observation devices 300, at positions corresponding to the installed positions of the candidate observation devices 300 in the screen. Specific exemplary selection screens in the camera map mode will be described below with reference to FIGS. 12 and 13.

Figure 12:
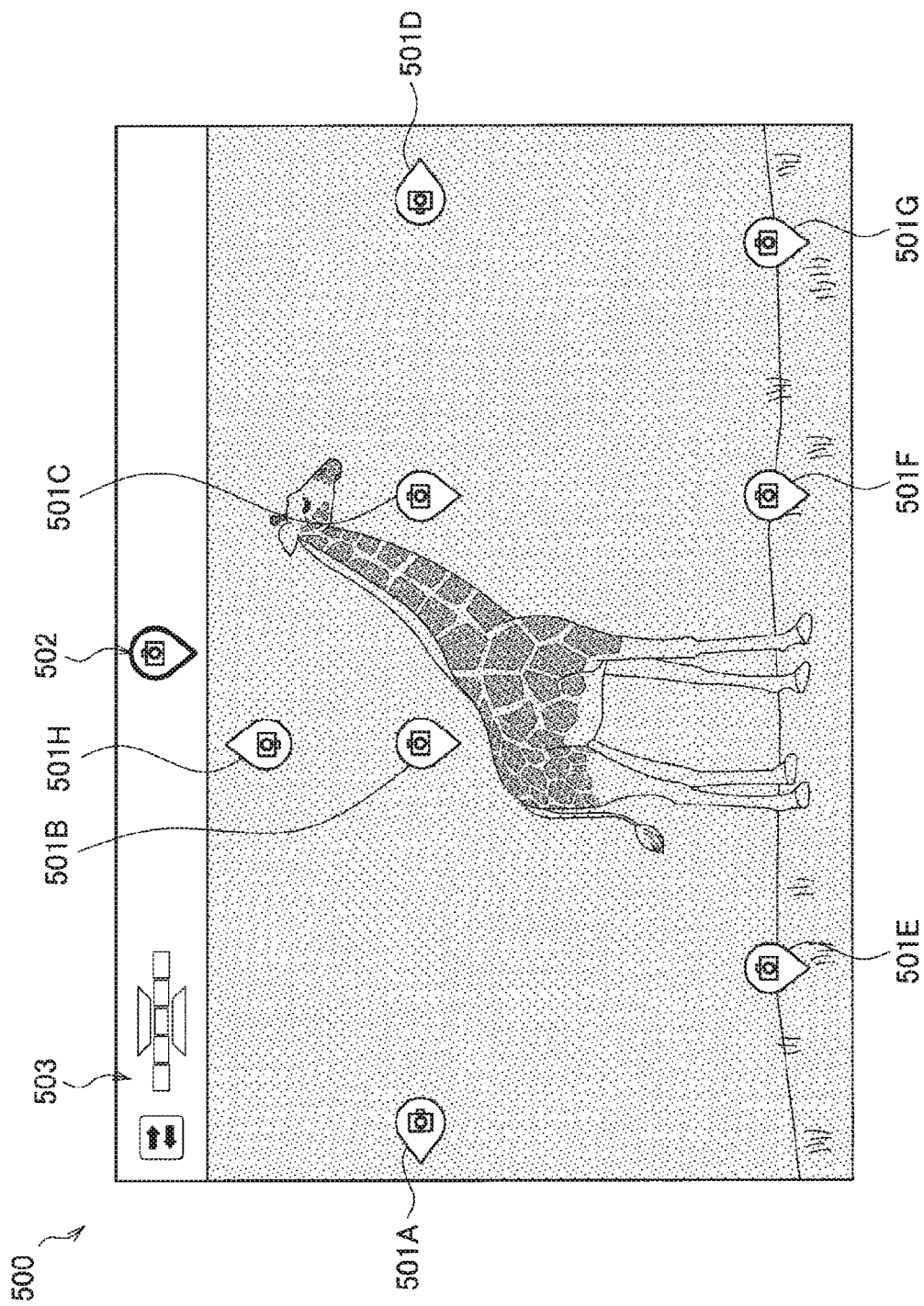
FIG. 12 is an illustration of an exemplary selection screen in a camera map mode according to the present embodiment.

FIG. 12 is an illustration of an exemplary selection screen in the camera map mode according to the present embodiment. As illustrated in FIG. 12, the background of the selection screen 500 in the camera map mode may include a view the same as the view when the user watches the animal directly at the current location, similarly to the initial screen 400, or may include the captured image captured by any observation device 300. Then, the selection screen 500 in the camera map mode includes camera icons 501A to 501H corresponding to the observation devices 300, at positions corresponding to the installed positions of the observation devices 300 in the screen. The camera icons 501A to 501D correspond to the observation devices 300 installed so as to capture the animal at the side angle. The camera icons 501E to 501G correspond to the observation devices 300 installed so as to capture the animal at the bottom angle. The camera icon 501H corresponds to the observation device 300 installed so as to capture the animal at the top angle. Selection of one camera icon by the user from the camera icons 501A to 501H, causes generation of the observation screen on the basis of the captured image captured by the observation device 300 corresponding to the selected camera icon.

Note that a display object 502 indicating that the current mode is the camera map mode and a display object 503 for allowing the mode to switch to the list display mode to be described later, are displayed on the header of the selection screen 500. Selection of the display object 503 by the user causes the display to switch to the selection screen in the list display mode.

Figure 13:
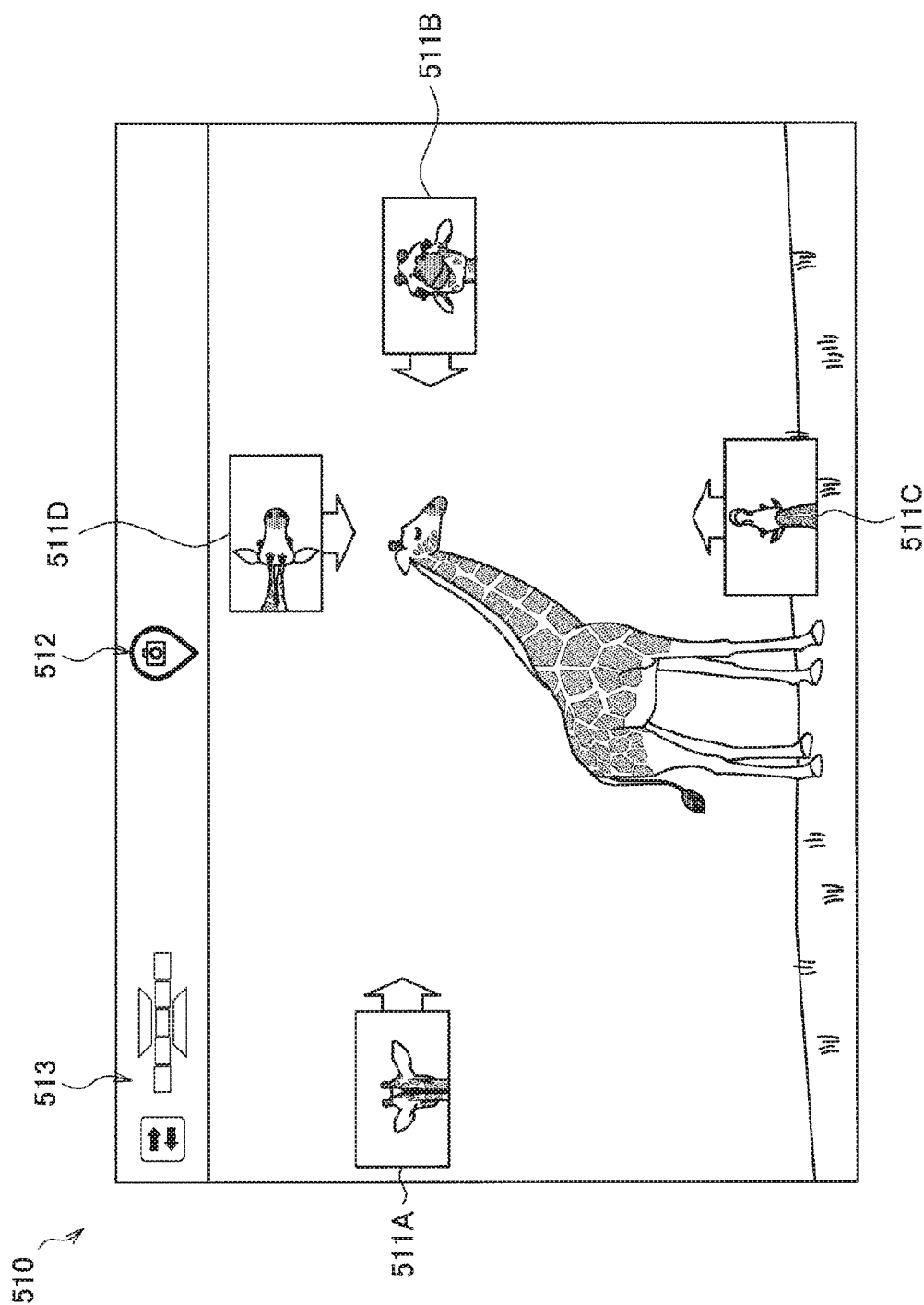
FIG. 13 is an illustration of an exemplary selection screen in the camera map mode according to the present embodiment.

FIG. 13 is an illustration of an exemplary selection screen in the camera map mode according to the present embodiment. As illustrated in FIG. 13, the selection screen 510 in the camera map mode includes thumbnails 511A to 511D corresponding to the observation devices 300, at positions corresponding to the installed positions of the observation devices 300 in the screen. The thumbnails 511A to 511D each reduce and display the captured image captured in real time by the corresponding observation device 300. The thumbnails 511A and 511B correspond to the observation devices 300 installed so as to capture the animal at the side angle. The thumbnail 511C corresponds to the observation device 300 installed so as to capture the animal at the bottom angle. The thumbnail 511D corresponds to the observation device 300 installed so as to capture the animal at the top angle. Selection of one thumbnail by the user from the thumbnails 511A to 511D causes generation of the observation screen on the basis of the captured image captured by the observation device 300 corresponding to the selected thumbnail.

Note that a display object 512 indicating that the current mode is the camera map mode and a display object 513 for allowing the mode to switch to the list display mode to be described later, are displayed on the header of the selection screen 510. Selection of the display object 513 by the user causes the display to switch to the selection screen in the list display mode.

Thus, because the camera icons or the thumbnails are displayed at the positions corresponding to the installed positions of the corresponding observation devices 300 on each selection screen in the camera map mode, the user can easily select a visual point for observation screen generation. Particularly, display of the thumbnails enables the user to predict what type of observation screen is generated, before selection, resulting in improvement in convenience.

List Display Mode

In the list display mode, the display device 100 displays display objects including the captured images captured by the candidate observation devices 300, arranged at heights corresponding to the angles of the capturing directions of the candidate observation devices 300 to a vertical direction. Specific exemplary selection screens in the list display mode will be described below with reference to FIGS. 14 and 15.

Figure 14:
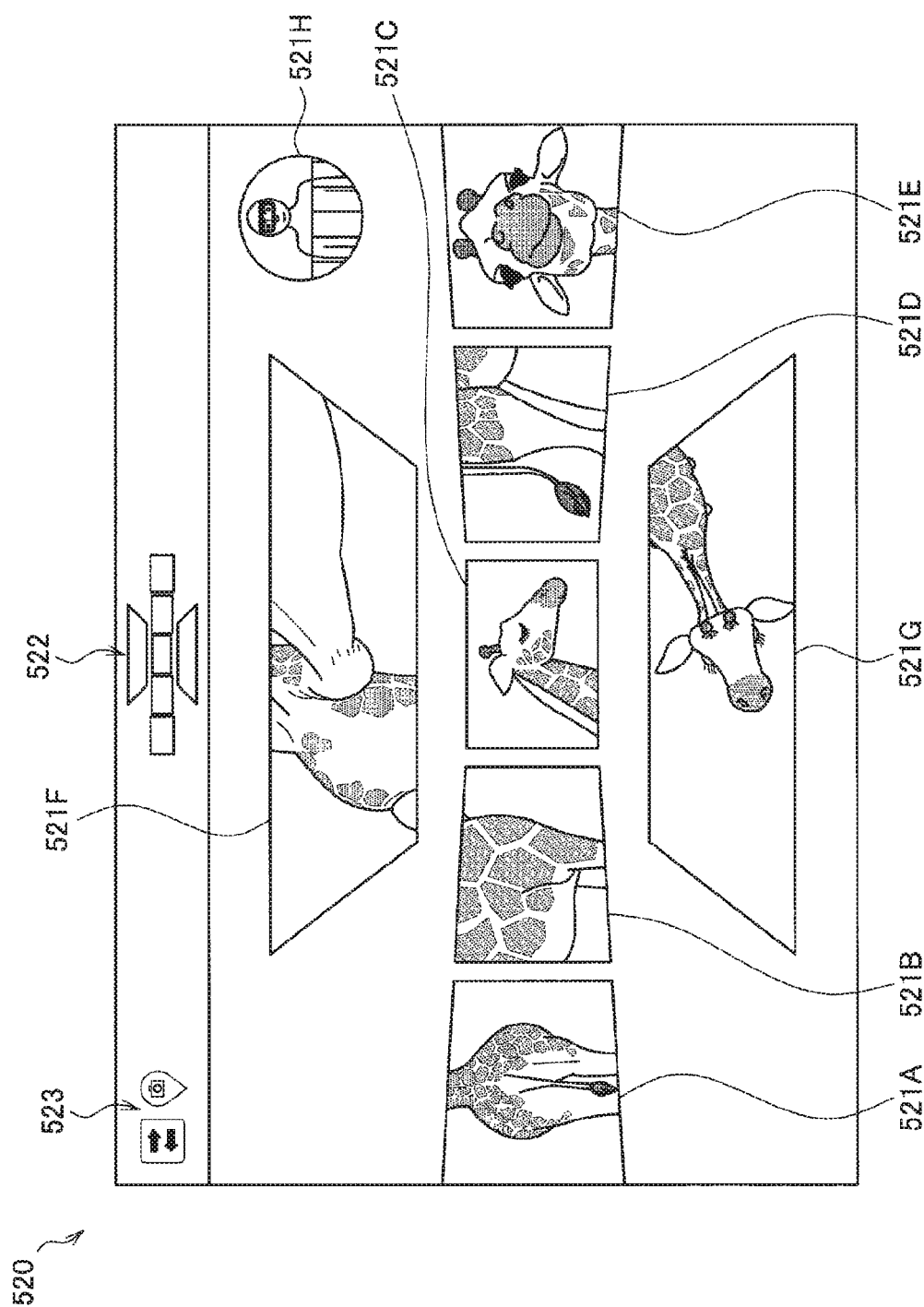
FIG. 14 is an illustration of an exemplary selection screen in a list display mode according to the present embodiment.

FIG. 14 is an illustration of an exemplary selection screen in the list display mode according to the present embodiment. As illustrated in FIG. 14, the selection screen 520 in the list display mode has thumbnails 521A to 521G of the captured images captured by the observation devices 300, arranged at heights corresponding to the angles of the capturing directions of the observation devices 300 to the vertical direction, displayed thereon. The thumbnails 521A to 521E corresponding to the observation devices 300 installed so as to capture the animal at the side angle (namely, the angle of the capturing direction to the vertical direction is approximately 90°), are arranged at the middle portion in the screen. This arrangement displays a view expected to be watched when the user actually watches the animal in a horizontal direction, horizontally to the user. The thumbnail 521F corresponding to the observation device 300 installed so as to capture the animal at the bottom angle (namely, the angle of the capturing direction to the vertical direction is approximately 180°), is arranged at the upper portion in the screen. This arrangement displays a view expected to be watched when the user actually looks up at the animal at the bottom angle, at a position at which the user looks up. The thumbnail 521G corresponding to the observation device 300 installed so as to capture the animal at the top angle (namely, the angle of the capturing direction to the vertical direction is approximately 0°), is arranged at the lower portion in the screen. This arrangement displays a view to be watched when the user actually looks down at the animal at the top angle, at a position at which the user looks down. Note that in a case where an observation device 300 is installed such that the visual-line direction of the animal is identical to the capturing direction, as illustrated in FIG. 14, a thumbnail 521H of the captured image captured by the observation device 300 may be displayed on the selection screen 520. Selection of one thumbnail by the user from the thumbnails 521A to 521H, causes generation of the observation screen on the basis of the captured image captured by the observation device 300 corresponding to the selected thumbnail.

Here, part of thumbnails may be displayed on the selection screen 520, and the user may replace a thumbnail being displayed with a thumbnail not being displayed. For example, as illustrated in FIG. 14, the thumbnails 521A to 521E arranged in the middle portion in the screen are disposed surrounding the user virtually. Thus, the user may operate to rotate the surrounding and may cause new display of a thumbnail of the captured image captured by another observation device 300 installed so as to capture the animal at the side angle. In this respect, as the thumbnails 521A to 521E, thumbnails based on the captured images captured by the observation devices 300 distant from each other in capturing direction in the horizontal direction, are displayed. Therefore, even with no replacement of thumbnails, widely visual-point candidates for observation screen generation can be provided on the selection screen 520.

Note that a display object 522 indicating that the current mode is the list display mode and a display object 523 for allowing the mode to switch to the camera map mode, are displayed on the header of the selection screen 520. Selection of the display object 523 by the user causes the display to switch to the selection screen in the camera map mode.

Figure 15:
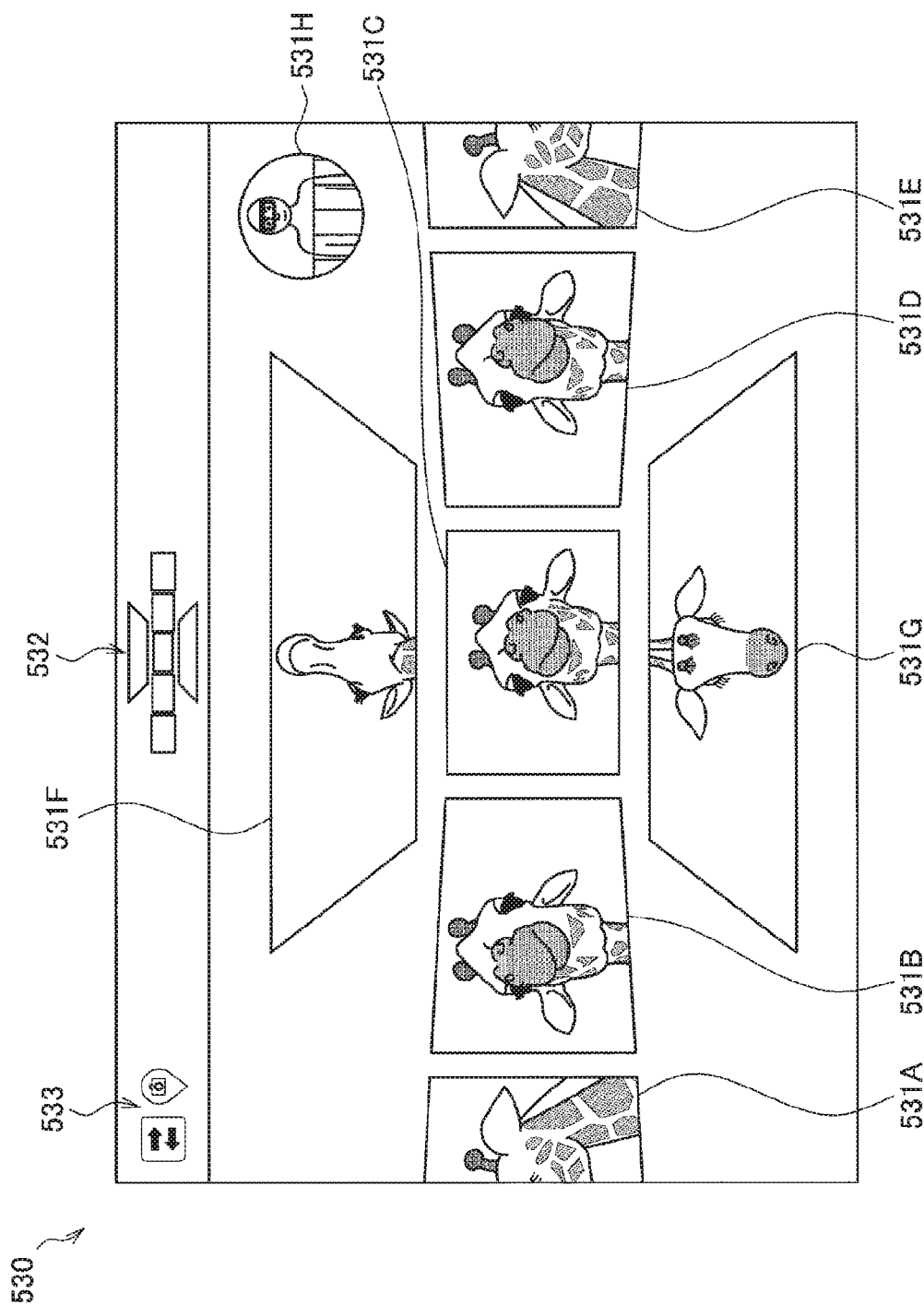
FIG. 15 is an illustration of an exemplary selection screen in the list display mode according to the present embodiment.

FIG. 15 is an illustration of an exemplary selection screen in the list display mode according to the present embodiment. As illustrated in FIG. 15, similarly to FIG. 14, the selection screen 530 in the list display mode has thumbnails 531A to 531G of the captured images captured by the observation devices 300, arranged at heights corresponding to the angles of the capturing directions of the observation devices 300 to the vertical direction, displayed thereon. Furthermore, as illustrated in FIG. 15, similarly to FIG. 14, a thumbnail 531H of the captured image captured by the observation device 300 installed such that the capturing direction of the observation device 300 is identical to the visual-line direction of the animal, is displayed on the selection screen 530.

Here, as the thumbnails 531A to 531E, thumbnails based on the captured image captured by the observation devices 300 close to each other in capturing direction in the horizontal direction (e.g., adjacently installed), are displayed on the selection screen 530. Therefore, similar visual-point candidates for observation screen generation can be provided on the selection screen 530.

Note that a display object 532 indicating that the current mode is the list display mode and a display object 533 for allowing the mode to switch to the camera map mode, are displayed on the header of the selection screen 530. Selection of the display object 533 by the user causes the display to switch to the selection screen in the camera map mode.

Thus, because the thumbnails are arranged at the heights corresponding to the angles of the capturing directions of the observation devices 300 to the vertical direction on each selection screen in the list display mode, the capturing directions of the observation devices 300 can be harmonized with the upward and downward visual-line direction of the user.

Note that, in FIGS. 14 and 15, the background of each selection screen in the list display mode is in solid black, but may be similar to the background of each selection screen in the camera map mode.

Here, the selection manipulation, such as selection of an observation device 300, on each selection screen described above, can be achieved variously. For example, in a case where there is a display object at which the user is gazing, the display device 100 may recognize that the user has selected the display object.

<4.3. Display of Observation Screen>

The observation screen is a screen resulting from output based on the observation information by the selected observation device 300 on the selection screen. Specifically, the observation screen is a screen including the captured image captured in real time by the selected observation device 300. Particularly, in a case where the user performs the contact manipulation on the observation screen, the corresponding tactile information is output.

For details, in a case where a predetermined manipulation to a predetermined region of the observation target is recognized on the observation screen, the display device 100 causes the output device 200 to output the tactile information imitating the tactile sensation acquired at the touch of the observation target. The predetermined manipulation is the contact manipulation. This arrangement enables the user to enjoy user experience with realistic feeling as if the user has come close to and touched the observation target even when apart from the observation target.

Furthermore, the display device 100 displays information indicating that the contact manipulation is allowed, in association with the predetermined region, namely, a region to which the contact manipulation is allowed, on the observation screen. The region to which the contact manipulation is allowed, can vary between, for example, the neck, the face, or the jaws in accordance with, for example, the type of the animal or the current emotion of the animal. This arrangement enables the user to perform the contact manipulation directly to the region allowing enjoyment of the output of the tactile information.

Specific examples of the observation screen will be described below with reference to FIGS. 16 to 18.

Figure 16:
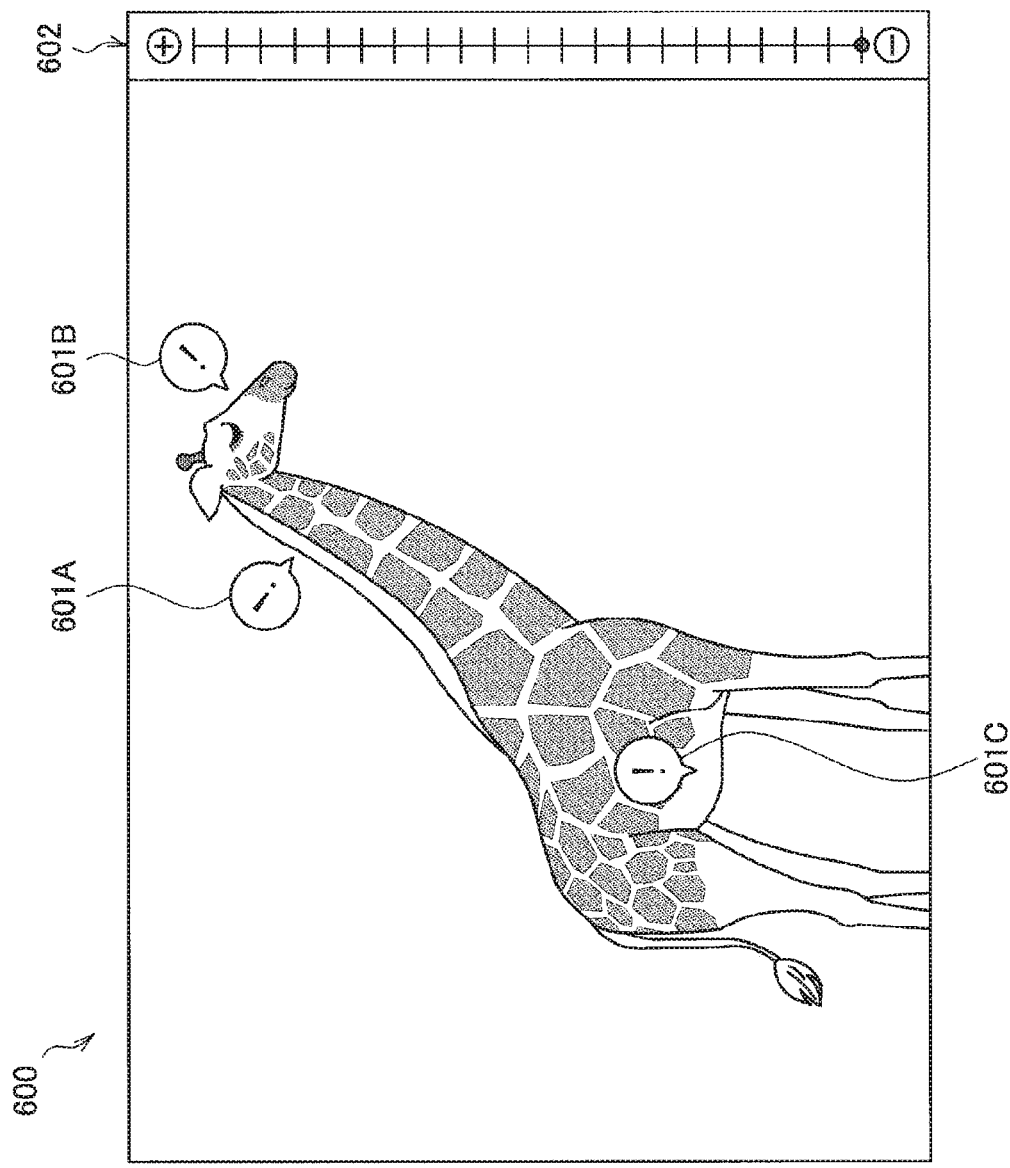
FIG. 16 is an illustration of an exemplary observation screen according to the present embodiment.

FIG. 16 is an illustration of an exemplary observation screen according to the present embodiment. As illustrated in FIG. 16, the observation screen 600 has annotations 601A to 601C indicating that the contact manipulation is allowed, and information 602 indicating the current zoom ratio, displayed thereon. Performance of the zoom manipulation by the user enables the zoom ratio to be changed arbitrarily in the observation screen. The observation screen due to a zoom-in manipulation performed by the user, is illustrated in FIG. 17.

Figure 17:
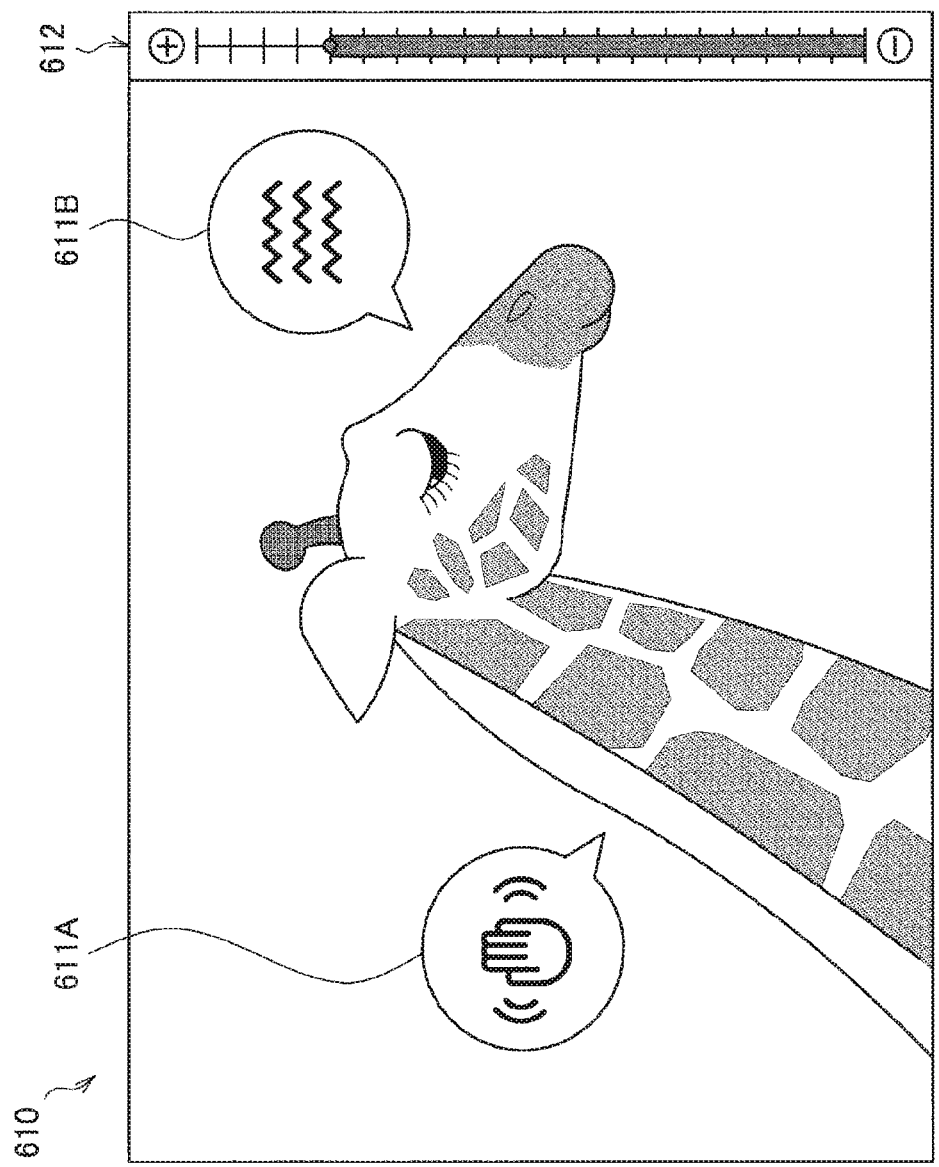
FIG. 17 is an illustration of an exemplary observation screen according to the present embodiment.

FIG. 17 is an illustration of an exemplary observation screen according to the present embodiment. As illustrated in FIG. 17, the observation screen 610 having a screen in which the observation target is zoomed in, displayed thereon, has annotations 611A and 611B indicating that the contact manipulation is allowed, and information 612 indicating the current zoom ratio, displayed thereon. Here, the annotation 611A has an icon indicating that performance of the contact manipulation causes the observation target to make a positive reaction (e.g., pleasure), displayed therein. Furthermore, the annotation 611B has an icon indicating that the observation target makes a negative reaction (e.g., anger), displayed therein. Needless to say, the user does not actually touch the observation target, and thus these reactions are virtual.

Here, as illustrated in FIGS. 16 and 17, the display device 100 may control the degree of detail of the information indicating that the contact manipulation is allowed, on the basis of the size of the observation target in the observation screen. For example, in a case where the zoom ratio is low, the display device 100 displays the annotation indicating that the contact manipulation is allowed. This arrangement enables the user to perform the zoom manipulation directly to, for example, the region at which the annotation is displayed. On the other hand, in a case where the zoom ratio is high, the display device 100 displays the annotation indicating the expected reaction of the observation target in addition to that the contact manipulation is allowed. This arrangement enables the user to perform the contact manipulation, for example, with selection of the region that causes the observation target to make a positive reaction.

The display device 100 may generate the reaction of the observation target, in accordance with the emotion of the observation target. In other words, the display device 100 can dynamically change the content or the shape of the annotation, in accordance with the emotion of the observation target. Furthermore, the display device 100 may determine whether or not the contact manipulation is allowed, in accordance with the emotion of the observation target. In other words, the display device 100 can dynamically change whether or not to display the annotation, in accordance with the emotion of the observation target. Furthermore, the display device 100 may dispose the annotation at a region that is less likely to cause a negative reaction at a touch. In other words, the display device 100 can dynamically change the display position of the annotation, in accordance with the emotion of the observation target.

Here, the emotion of the observation target can be estimated by machine learning, such as a neural net based on the observation information regarding the observation target. For example, emotion corresponding to, for example, the type, the behavior, and the shaking of the animal, is estimated by learning based on the captured image. Furthermore, emotion corresponding to the spectrum and the length of a cry is estimated by learning based on the sound.

Instead of or in addition to the emotion of the observation target described above, the annotation may be displayed in accordance with the behavior, such as the sleeping/walking of the observation target, the presence or absence of distinctive tactile sensation, or the like. For example, the display position of the annotation may vary in response to a difference in behavior, or the annotation may be displayed preferentially at a position enabling the heartbeat to be sensed strongly, such as near the heart.

The information excluding the captured image, included in the observation information, may be output in conjunction with zooming in the observation screen. For example, the display device 100 may control the directivity of the microphone of the observation device 300 to face the observation target included in the observation screen, in conjunction with zooming, and may output, for example, the cry of the observation target. Furthermore, the display device 100 may output the smell of the observation target included in the observation screen, in conjunction with zooming.

Performance of a cancel manipulation by the user on the observation screen, causes the display device 100 to display the selection screen again. This arrangement enables the user to reselect a visual point for observation screen generation. In addition, the display device 100 may display a display object recommending another visual point, on the observation screen. An example of the case will be described with reference to FIG. 18.

Figure 18:
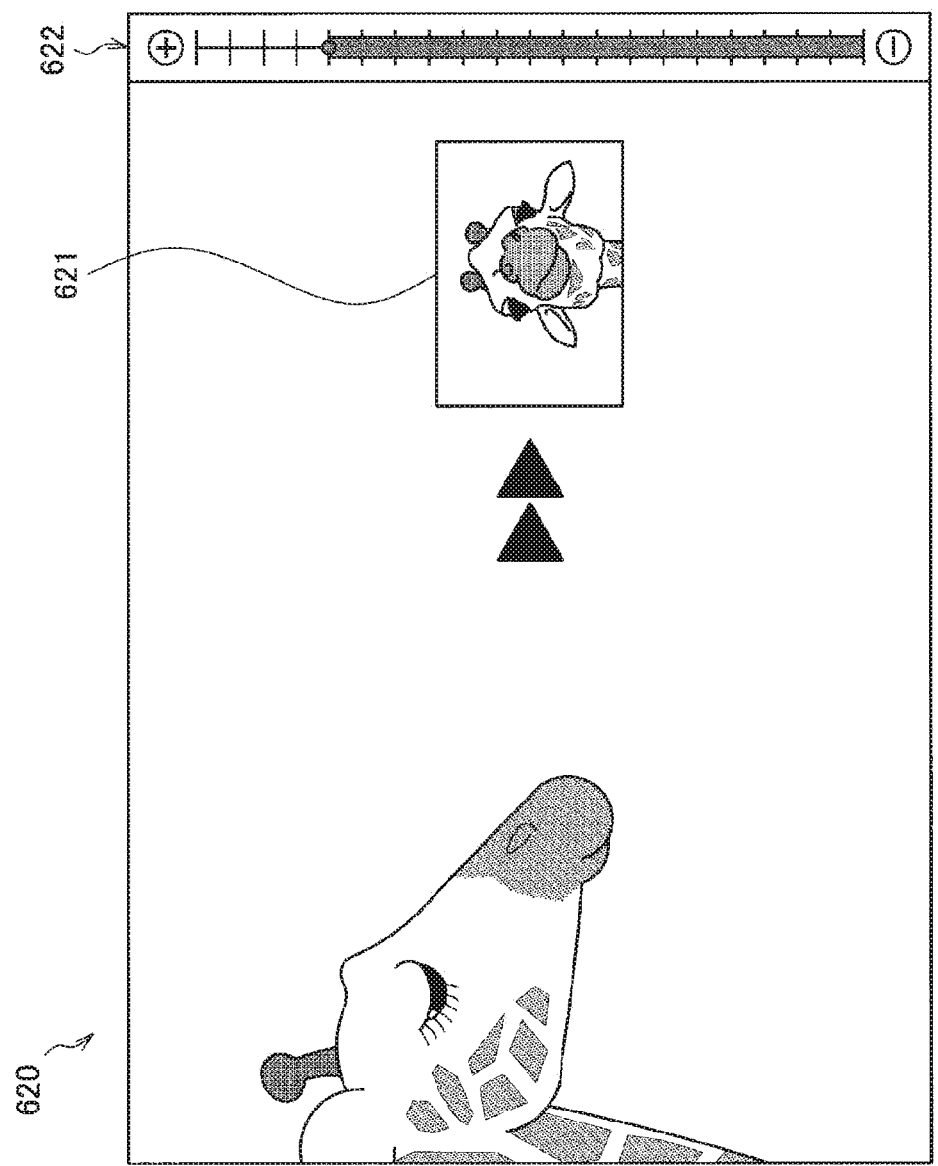
FIG. 18 is an illustration of an exemplary observation screen according to the present embodiment.

FIG. 18 is an illustration of an exemplary observation screen according to the present embodiment. As illustrated in FIG. 18, the observation screen 620 having a screen in which the observation target is zoomed in, displayed thereon, has a display object 621 recommending another visual point and information 622 indicating the current zoom ratio, displayed thereon. The display object 621 is the thumbnail of the captured image captured by another observation device 300. Selection of the display object 621 by the user causes the display device 100 to generate the observation screen based on the captured image captured by the another observation device 300, resulting in switching of the display.

<4.4. User Manipulation>

(1) Zoom Manipulation

The zoom manipulation will be described below with reference to FIGS. 19 to 24.

First, setting of coordinate axes for describing the zoom manipulation will be described with reference to FIG. 19.

Figure 19:
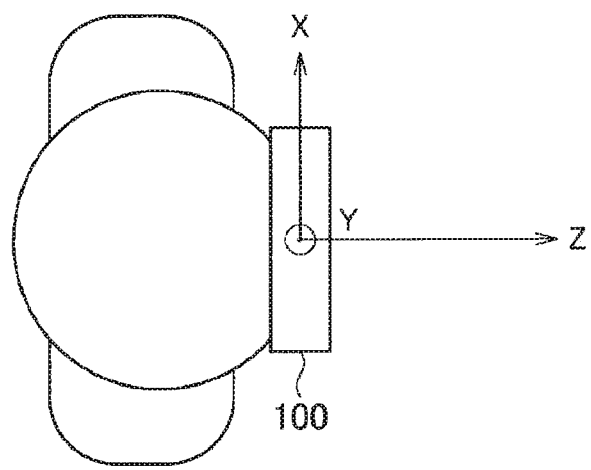
FIG. 19 is an illustration of exemplary setting of coordinate axes according to the present embodiment.

FIG. 19 is an illustration of exemplary setting of coordinate axes according to the present embodiment. As illustrated in FIG. 19, with the position of the display device 100 worn on the user as the origin, the forward direction, the horizontal direction (namely, the lateral direction of the screen), and the zenith direction (namely, the longitudinal direction of the screen) with respect to the user are defined as the Z axis, the X axis, and the Y axis, respectively, resulting in setting of the coordinate axes.

Control of Zoom Ratio Corresponding to Distance in Z-Axis Direction

While displaying a screen including the captured image of the observation target (e.g., the observation screen), the display device 100 controls the size of the observation target in the screen, on the basis of the distance between the recognition target that the user wearing the display device 100 manipulates and a criterial position. For more simplification, the display device 100 controls the zoom ratio in the observation screen, in accordance with the distance between the recognition target that user manipulates and the criterial position.

Here, the criterial position that is the position of the display device 100 worn on the user, may be the origin in FIG. 19. More specifically, the criterial position may be the position of the outward camera 112 formed as a stereo camera, or the position of the depth sensor. Furthermore, the distance between the recognition target and the criterial position may be the distance in a criterial direction between the criterial position and the recognition target, and the criterial direction may be, for example, the Z-axis direction in FIG. 19. For more simplification, the display device 100 may control the zoom ratio in the observation screen, in accordance with the distance between the recognition target and the display device 100 in the forward direction of the user.

Specifically, the display device 100 enlarges the observation target in the observation screen as the distance between the recognition target and the criterial position lengthens. In other words, the display device 100 increases the zoom ratio in the observation screen as the distance in the criterial direction between the recognition target and the criterial position lengthens. Meanwhile, the display device 100 reduces the observation target in the observation screen as the distance between the recognition target and the criterial position shortens. In other words, the display device 100 decreases the zoom ratio in the observation screen as the distance in the criterial direction between the recognition target and the criterial position lengthens.

The recognition target is considered variously. For example, the recognition target may be a hand of the user in a predetermined shape. As another example, the recognition target may be a leg of the user, a tool, or the like, or may be a virtual object that the user manipulates in the virtual space.

The predetermined shape is considered variously. For example, the recognition target may be a hand of the user with fingers forming a ring. The ring may be formed with one hand, or may be formed with both hands. As another example, the recognition target may be a hand of the user forming a fist, or the like.

The upper limit and the lower limit of the distance between the recognition target and the criterial position, may be previously set. For example, in a case where the recognition target is a hand of the user with fingers forming a ring, the upper limit may be approximately one meter in consideration of the length of the arm of the user. Furthermore, the display device 100 may change the zoom ratio in the observation screen when a variation is a threshold value or more in the distance between the recognition target and the criterial position. This arrangement prevents the trembling motion of the arm from affecting the zoom ratio, resulting in prevention of, for example, screen jitter. Note that the threshold value may be, for example, approximately 15 centimeters.

Figure 20:
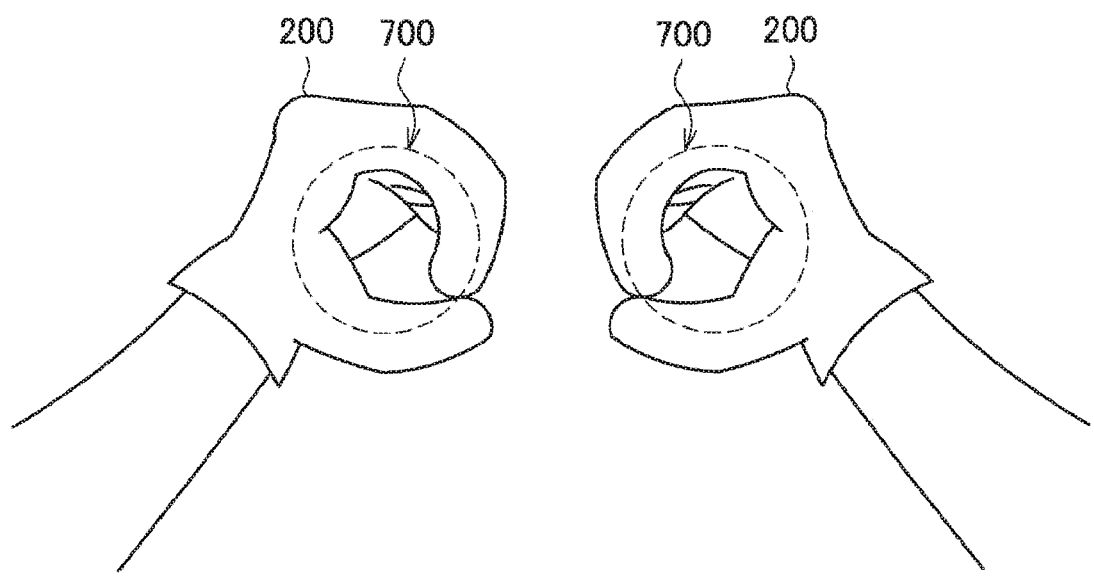
FIG. 20 is an illustration for describing an exemplary zoom manipulation according to the present embodiment.
Figure 21:
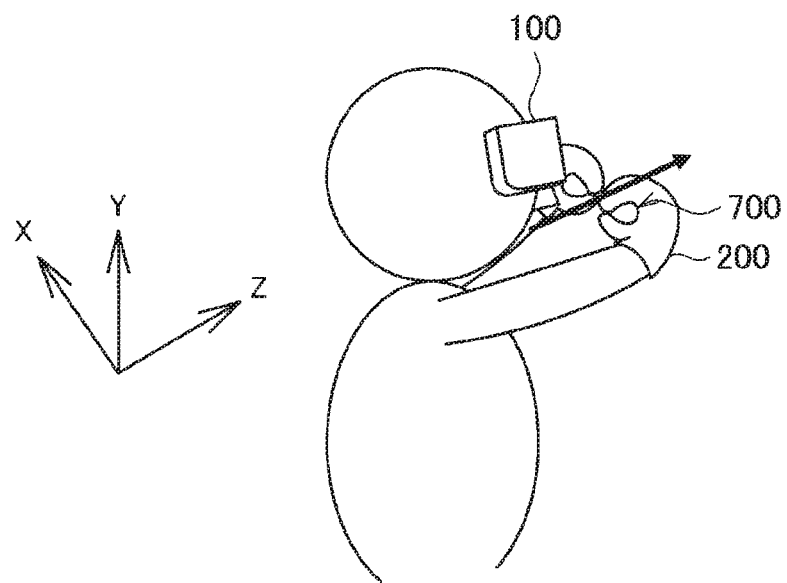
FIG. 21 is an illustration for describing an exemplary zoom manipulation according to the present embodiment.
Figure 22:
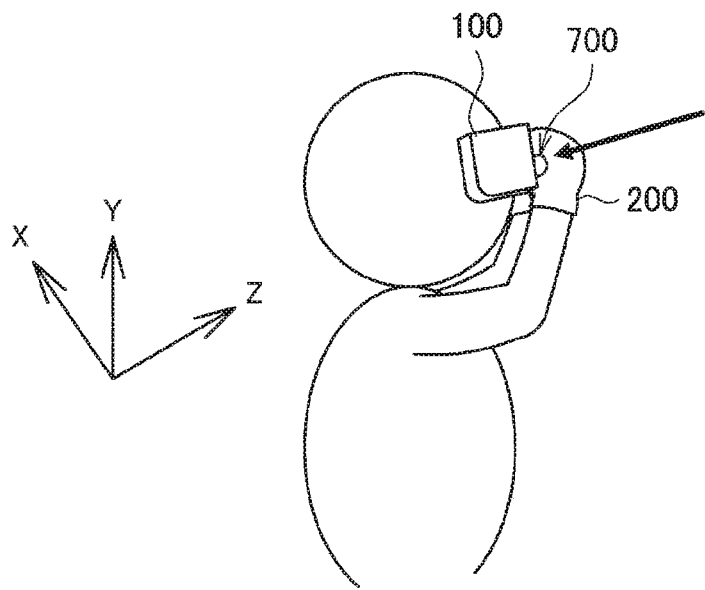
FIG. 22 is an illustration for describing an exemplary zoom manipulation according to the present embodiment.

An exemplary zoom manipulation will be described below with reference to FIGS. 20 to 22. FIGS. 20 to 22 are illustrations for describing the exemplary zoom manipulation according to the present embodiment.

FIG. 20 illustrates an exemplary recognition target. The recognition targets 700 illustrated in FIG. 20 are both hands of the user with fingers of each hand forming a ring. Such a shape enables the user to perform the zoom manipulation with the image of looking far away through a pair of binoculars.

FIG. 21 illustrates an exemplary zoom-in manipulation. As illustrated in FIG. 21, the display device 100 recognizes a manipulation in which the user stretches the arms out to cause the recognition targets 700 distant from the display device 100 in the Z-axis direction, as the zoom-in manipulation. Then, the display device 100 increases the zoom ratio in the observation screen.

FIG. 22 illustrates an exemplary zoom-out manipulation. As illustrated in FIG. 22, the display device 100 recognizes a manipulation in which the user folds the arms to cause the recognition targets 700 close to the display device 100 in the Z-axis direction, as the zoom-out manipulation. Then, the display device 100 decreases the zoom ratio in the observation screen.

Control of Zoom Ratio Corresponding to Other Information

The display device 100 may further control the zoom ratio, on the basis of other information. This arrangement enables improvement in the accuracy of recognizing the zoom manipulation.

For example, in a case where the recognition target is a hand of the user with fingers forming a ring, the display device 100 may further control the size of the observation target in the observation screen, on the basis of the attitude of the ring. This respect will be described with reference to FIG. 23.

FIG. 23 is an illustration for describing an exemplary zoom manipulation according to the present embodiment. As illustrated on the upper side of FIG. 23, in a case where the zoom-in manipulation is performed in which the user stretches the arms out to cause the rings (namely, the recognition targets) 700 distant from the display device 100 in the Z-axis direction, the angle of the rings 700 to the Z-axis direction decreases typically in terms of the movable range of the wrists. On the other hand, as illustrated on the lower side of FIG. 23, in a case where the zoom-out manipulation is performed in which the user folds the arms to cause the recognition targets 700 close to the display device 100 in the Z-axis direction, the angle of the rings 700 to the Z-axis direction increases typically. Thus, the display device 100 may control the zoom ratio in accordance with the angle of the rings 700 to the Z-axis direction. For example, the display device 100 may recognize that the zoom-in manipulation is being performed in a case where the angle of the rings 700 to the Z-axis direction decreases, and may recognize that the zoom-out manipulation is being performed in a case where the angle of the rings 700 to the Z-axis direction increases. Furthermore, the display device 100 may determine false recognition in a case where the angle of the rings 700 to the Z-axis direction exceeds or falls below a threshold value, and may stop the control of the zoom ratio.

As another example, the display device 100 may further control the size of the observation target in the observation screen, on the basis of the sensing information acquired by the output device 200. For example, in a case where the sensing information acquired by the output device 200 indicates a predetermined pattern, the display device 100 may recognize the zoom manipulation. Specifically, the display device 100 recognizes, for example, whether or not fingers have formed a ring, the angle of the ring, or the movement of the ring, on the basis of the sensing information by the acceleration sensor or the gyroscope sensor of the output device 200. Furthermore, the display device 100 recognizes whether or not fingers have formed a ring, on the basis of the sensing information acquired by the contact sensor that detects contact between the fingers, in the output device 200. Note that account may be taken of the sensing information acquired by a sensor provided at, for example, a bangle, a watch, a finger ring, or dress, in addition to the sensors provided at the glove-type output device 200.

Control of Central Position of Zooming

The display device 100 controls the central position of control of the size of the observation target in the observation screen, namely, the central position of control of the zoom ratio. The central position is also referred to as the central position of zooming, below.

For example, on the basis of feature points, such as the eyes, the ears, or the nose of the observation target, the display device 100 may recognize the face, and may have the recognized face as the central position of zooming. Furthermore, in a case where a plurality of observation targets is displayed in the observation screen, the display device 100 may have an observation target displayed closer to the center in the visual field of the user, as the central position of zooming.

Furthermore, the display device 100 may control the central position of control of the size of the observation target in the observation screen, on the basis of the position of the recognition target in a direction orthogonal to the criterial direction. For example, the display device 100 causes the coordinates of the central position of zooming viewed from the central position of the observation screen, to correspond to the coordinates of the recognition target viewed from the origin on the XY plane orthogonal to the Z-axis direction (namely, the Z axis). For more simplification, in a case where the recognition target is a hand of the user with fingers forming a ring, the display device 100 moves the central position of zooming upward, downward, left, and right, in accordance with the motion in the upward, downward, left, and right directions of the hand of the user. Thereafter, the display device 100 zooms in or zooms out with the central position as the center, in accordance with the motion in the forward direction of the hand of the user (namely, the Z-axis direction).

The display device 100 may display information indicating the central position. This arrangement enables the user to take aim with movement of the central position of zooming, for example, while moving the hand upward, downward, left, and right, before the zoom-in manipulation. Note that the information indicating the central position of zooming, may be information indicating the central point or information indicating a predetermined range from the central position. The latter information is also referred to as a focus range, below.

An exemplary observation screen in the zoom manipulation will be described below with reference to FIG. 24.

Figure 24:
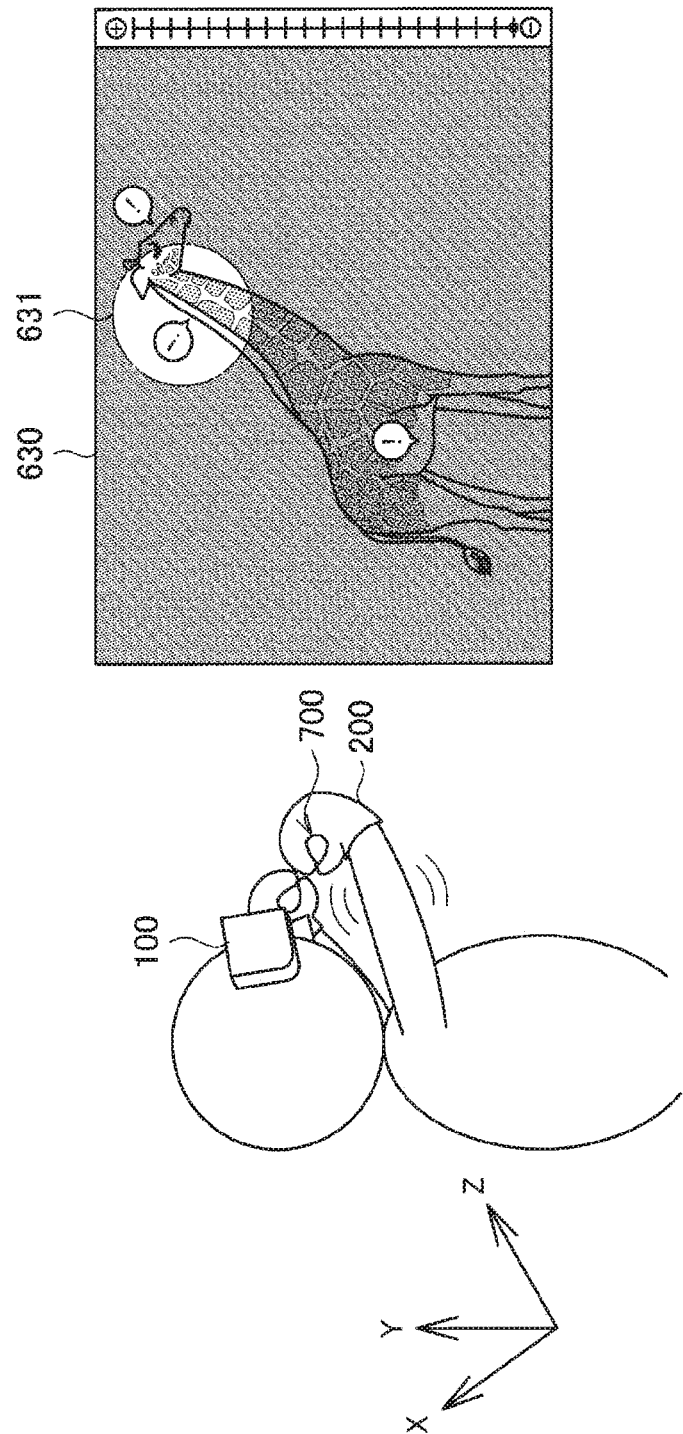
FIG. 24 is an illustration of an exemplary observation screen in zoom manipulation according to the present embodiment.

FIG. 24 is an illustration of the exemplary observation screen in the zoom manipulation according to the present embodiment. As illustrated in the left figure of FIG. 24, the user moves the recognition targets 700 upward, downward, left, and right while keeping the arms folded. As illustrated in the right figure of FIG. 26, the observation screen 630 has a focus range 631 displayed thereon. This arrangement enables the user to move the central position of zooming upward, downward, left, and right such that the desired region of the observation target is included in the focus range 631, before zooming-in. Then, the user performs the zoom-in manipulation while stretching the arms after taking aim, so that the region included in the focus range 631, that has been enlarged can be displayed on the observation screen.

Setting of Zoom Magnification

The display device 100 may set a maximum value or a minimum value in zoom magnification. For example, the maximum value in zoom magnification can be set to a magnification allowing display of the observation target equivalent in size to the observation target expected to be watched in a case where the user is present at a position allowing the user to touch the observation target if stretching a hand in real space. Furthermore, for example, the minimum value in zoom magnification can be set to a magnification allowing display of the observation target equivalent in size to the observation target expected to be watched in a case where the user watches the observation target from the current position in real space.

Setting of Zoom Speed

Zoom speed can be set in accordance with the speed or the acceleration in the criterial direction of the recognition target. The zoom speed may be set in consideration of the movable distance in the criterial direction of the recognition target. For example, in a case where the recognition target is a hand of the user with fingers forming a ring, the zoom speed may be set in consideration of the length of the arm. Specifically, a value acquired by dividing the speed or the acceleration of the stretch and draw of the arm by the length of the arm, can be set as the zoom speed. This arrangement allows achievement of the zoom speed equivalent between a child and an adult even when there are differences in the length of the arm and the speed of the stretch and draw. In a case where no information regarding the length of the arm is provided, information regarding the stature may be provided instead. The information regarding the stature may be input by the user or may be information regarding the height of the outward camera 112 from the ground, acquired by image recognition.

(2) Contact Manipulation

The display device 100 recognizes a manipulation in which the user touches the observation target in the virtual space displayed on the observation screen, as the contact manipulation.

For example, the display device 100 recognizes a motion in which the user makes the palm of a hand face the observation target in the virtual space, as the contact manipulation. Particularly, in a case where the recognition target in the zoom manipulation is a hand of the user with fingers forming a ring, the display device 100 may recognize a motion in which the user makes the palm of the hand face the observation target with the hand stretched, as the contact manipulation. In that case, the user can perform the contact manipulation seamlessly after performing the zoom-in manipulation while stretching the hand.

An exemplary contact manipulation will be described with reference to FIG. 25, and an exemplary observation screen during the contact manipulation will be described with reference to FIG. 26, below.

Figure 25:
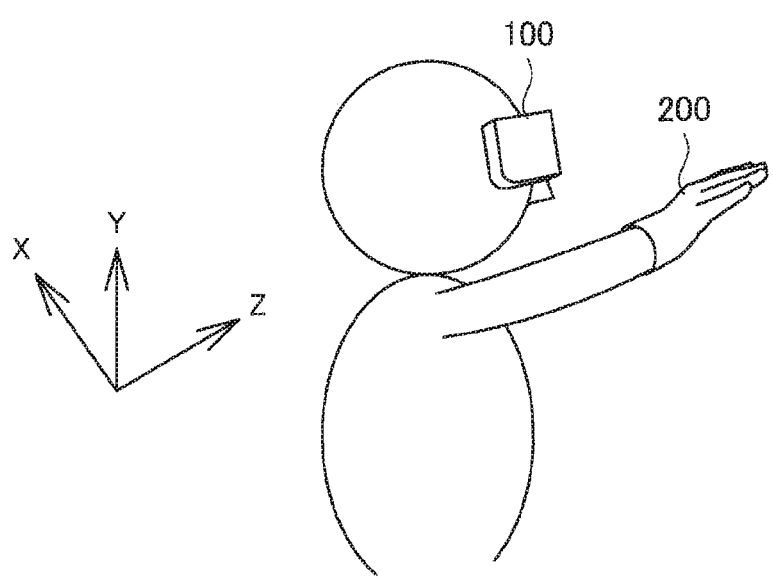
FIG. 25 is an illustration of an exemplary contact manipulation according to the present embodiment.

FIG. 25 is an illustration of the exemplary contact manipulation according to the present embodiment. As illustrated in FIG. 25, the user makes the palm of a hand open with the hand stretched. The user performs the contact manipulation in a similar motion to a case where coming close to and touching the observation target in real space, so that the user can receive the output of the tactile information from the output device 200.

Figure 26:
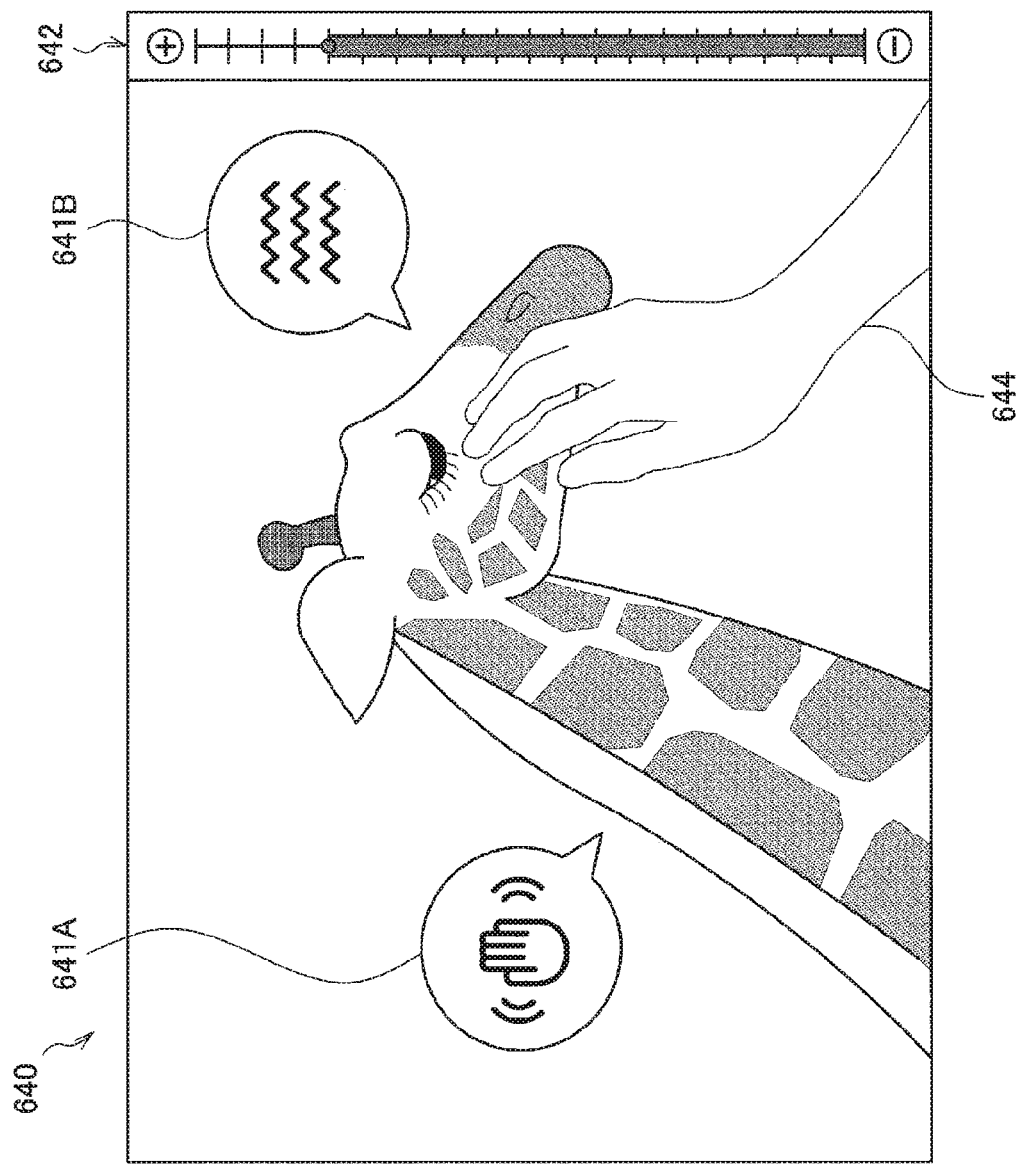
FIG. 26 is an illustration of an exemplary observation screen according to the present embodiment.

FIG. 26 is an illustration of the exemplary observation screen according to the present embodiment. As illustrated in FIG. 26, the observation screen 640 having a screen in which the observation target is zoomed in, displayed thereon, has annotations 641A and 641B indicating that the contact manipulation is allowed, and information 642 indicating the current zoom ratio, displayed thereon. Then, the display device 100 displays an image 644 indicating a hand of the user that performs the contact manipulation to the observation target, in superimposition on the observation target, on the observation screen 640. This arrangement enables further improvement of the realistic feeling of user experience. Note that, for allowance of contact in a case where the sense of distance to the observation target is close, the contact manipulation may be allowed when the observation target is displayed at a predetermined magnification or more.

(3) Cancel Manipulation

The display device 100 recognizes a cancel manipulation. For example, when recognizing the cancel manipulation in the observation screen, the display device 100 returns the zoom ratio to the default value, or returns the screen to the selection screen or the initial screen.

The cancel manipulation can be recognized variously. For example, the display device 100 recognizes, for example, a predetermined gesture, a predetermined sound command, or depression of a predetermined button, as the cancel manipulation. An exemplary cancel manipulation will be described below with reference to FIG. 27.

Figure 27:
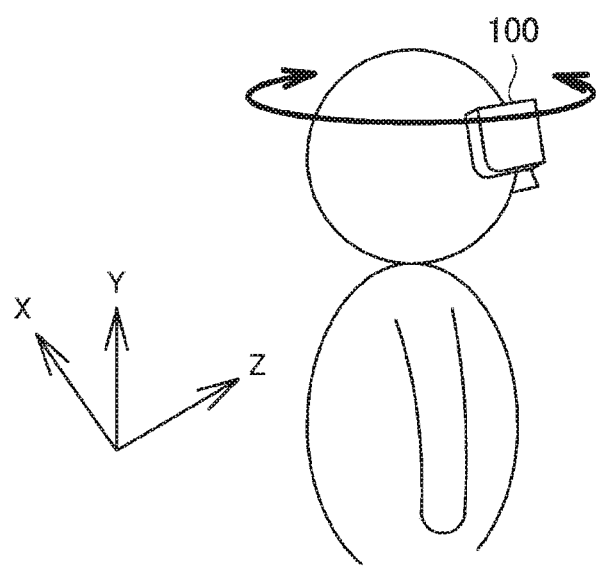
FIG. 27 is an illustration of an exemplary cancel manipulation according to the present embodiment.

FIG. 27 is an illustration of the exemplary cancel manipulation according to the present embodiment. As illustrated in FIG. 27, the display device 100 may recognize a motion in which the user turns the neck left and right, as the cancel manipulation. For example, the display device 100 may recognize the motion in which the user turns the neck left and right, with image recognition on the inter-frame difference, the lateral optical flow of the captured image, or the like, of the outward camera 112. Furthermore, the display device 100 may recognize the motion in which the user turns the neck left and right, on the basis of the acceleration acquired by the acceleration sensor. Furthermore, the display device 100 may recognize the motion in which the user turns the neck left and right, with recognition on a continuous pattern of pressure acquired by the pressure sensor in contact with the side of the face. Note that, preferably, the recognition methods described above are appropriately combined for use because of advantages and disadvantages, such as the image recognition deteriorates in accuracy in dark place.

<4.5. Inter-User Interaction>

In a case where a plurality of users each wearing the display device 100 is present, the display device 100 may perform display based on inter-user relationship.

For example, a plurality of display devices 100 worn on a plurality of users in a predetermined relationship, such as friendship or parent-child relationship, each can operate either in an individual mode in which an individual screen is displayed or in a group mode in which the screen of one user is displayed to another user. Each display device 100 in the individual mode displays the screen corresponding to a manipulation of the user wearing the display device 100. This arrangement enables each user to watch a favorite screen freely. Meanwhile, each display device 100 in the group mode displays the screen corresponding to a manipulation of one user of the plurality of users. This arrangement enables the plurality of users to enjoy the same user experience while watching a common screen. Switching may be appropriately made by user manipulation between the individual mode and the group mode.

Selection of one user in the group mode may be made by any user manipulation or may be previously set. For the former, the users in the group can enjoy user experience while exchanging the respective visual points selected by the users. For the latter, for example, a parent may be selected as the one user, and a child may be set as another user. In that case, the parent can provide rich user experience to the child. As another example, a guide in a zoo may be selected as the one user, and a visitor may be set as another user, previously.

<<5. Exemplary Hardware Configuration>>

Figure 28:
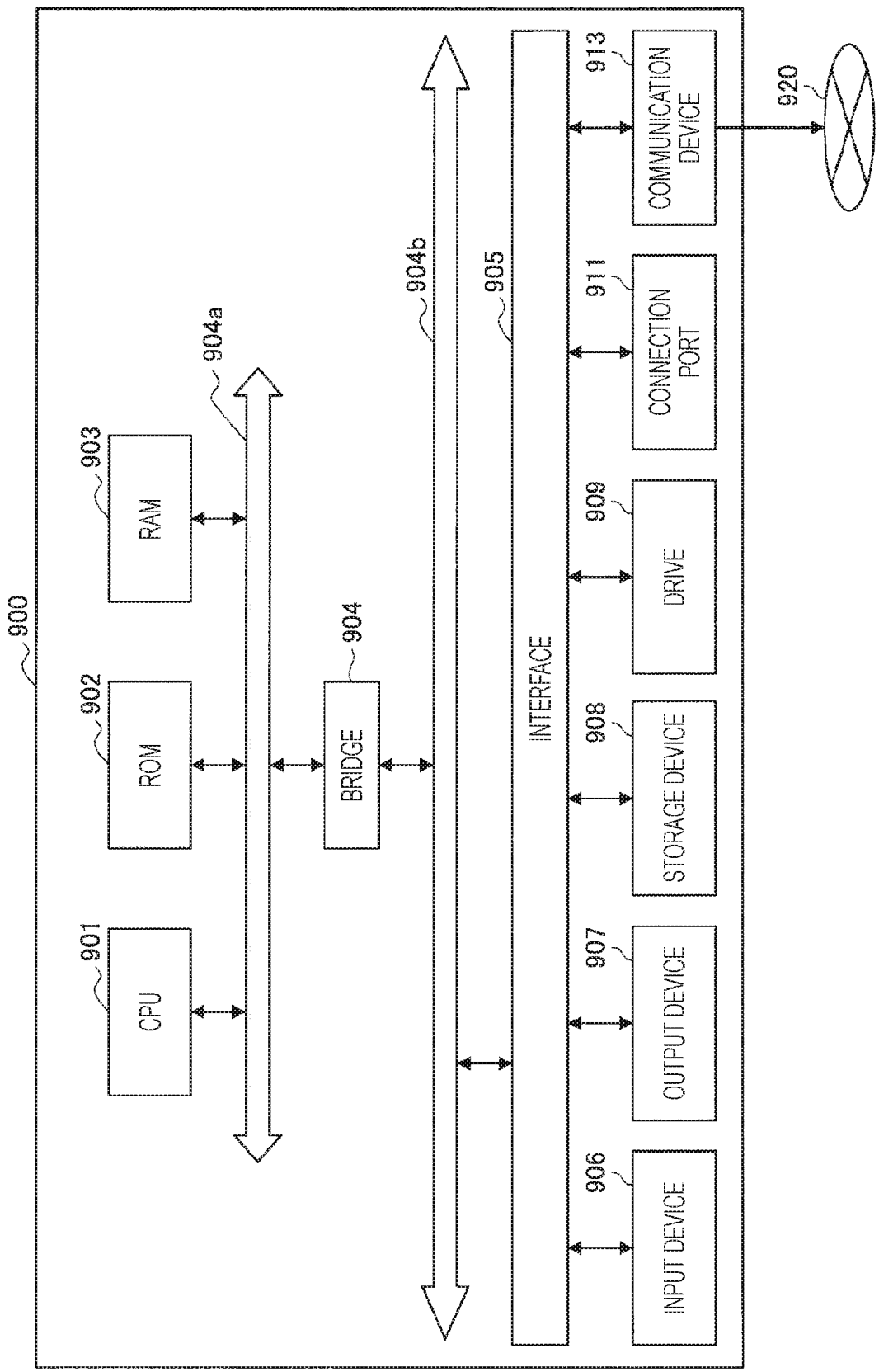
FIG. 28 is a block diagram of an exemplary hardware configuration of an information processing device according to the present embodiment.

Finally, the hardware configuration of an information processing device according to the present embodiment, will be described with reference to FIG. 28. FIG. 28 is a block diagram of an exemplary hardware configuration of the information processing device according to the present embodiment. Note that the information processing device 900 illustrated in FIG. 28 can achieve, for example, the display device 100 illustrated in FIG. 3, the output device 200 illustrated in FIG. 4, or the observation device 300 illustrated in FIG. 6. The information processing by the display device 100, the output device 200, or the observation device 300 according to the present embodiment, is achieved with the cooperation of software and hardware to be described below.

As illustrated in FIG. 28, the information processing device 900 includes a central processing unit (CPU) 901, a read only memory (ROM) 902, a random access memory (RAM) 903, and a host bus 904a. Furthermore, the information processing device 900 includes a bridge 904, an external bus 904b, an interface 905, an input device 906, an output device 907, a storage device 908, a drive 909, a connection port 911, and a communication device 913. The information processing device 900 may include an electric circuit and a processing circuit, such as a DSP or an ASIC, instead of or in addition to the CPU 901.

The CPU 901 functions as an arithmetic processing device and a control device, and controls the entire operation in the information processing device 900, in accordance with various programs. Furthermore, the CPU 901 may be a microprocessor. The ROM 902 stores, for example, a program and arithmetic parameters to be used by the CPU 901. The RAM 903 temporarily stores, for example, a program being used in execution of the CPU 901 and parameters varying appropriately in the execution. For example, the CPU 901 can form the control unit 150 illustrated in FIG. 3, the control unit 250 illustrated in FIG. 4, or the control unit 340 illustrated in FIG. 6.

The CPU 901, the ROM 902, the RAM 903 are connected mutually through the host bus 904a including, for example, a CPU bus. The host bus 904a is connected to the external bus 904b, such as a peripheral component interconnect/interface (PCI) bus, through the bridge 904. Note that the host bus 904a, the bridge 904, and the external bus 904b do not necessarily require separating, and thus these functions may be implemented in one bus.

The input device 906 is achieved with a device, such as a mouse, a keyboard, a touch panel, a button, a microphone, a switch, or a lever, to which the user inputs information, for example. Furthermore, for example, the input device 906 may be a remote control device with infrared light or other radio waves, or may be external connection equipment, such as a mobile phone or a PDA, compatible with the manipulation of the information processing device 900. Moreover, for example, the input device 906 may include an input control circuit or the like that generates an input signal, on the basis of the information input by the user with the input means, to output the input signal to the CPU 901. The user of the information processing device 900 manipulates the input device 906, so that the user can input various types of data or issue an instruction for processing operation, to the information processing device 900.

As another example, the input device 906 can include a device that detects information regarding the user. For example, the input device 906 can include various sensors, such as an image sensor (e.g., a camera), a depth sensor (e.g., a stereo camera), an acceleration sensor, a gyroscope sensor, a geomagnetic sensor, an optical sensor, an acoustic sensor, a range sensor, a pressure sensor, and a force sensor. Furthermore, the input device 906 may acquire information regarding the state of the information processing device 900 itself, such as the attitude or the travel speed of the information processing device 900, and information regarding the ambient surrounding of the information processing device 900, such as the ambient brightness or noise of the information processing device 900. Furthermore, the input device 906 may include a global navigation satellite system (GNSS) module that receives GNSS signals from GNSS satellites (e.g., global positioning system (GPS) signals from GPS satellites) and measures positional information including the latitude, the longitude, and the altitude of the device. Furthermore, regarding the positional information, for example, the input device 906 may detect the position through Wi-Fi (registered trademark), transmission and reception with, for example, a mobile phone, a PHS, or a smartphone, or near field communication. For example, the input device 906 can form the sensor unit 110 illustrated in FIG. 3, the sensor unit 210 illustrated in FIG. 4, or the sensor unit 310 illustrated in FIG. 6.

The output device 907 includes a device capable of notifying the user of acquired information, visually or aurally. Examples of the device include a display device, such as a CRT display device, a liquid crystal display device, a plasma display device, an EL display device, a laser projector, an LED projector, or a lamp, a sound output device, such as a speaker or a headphone, and a printer device. For example, the output device 907 outputs results acquired from various types of processing performed by the information processing device 900. Specifically, the display device visually displays the results acquired from various types of processing performed by the information processing device 900 in various formats, such as a text, an image, a table, and a graph. On the other hand, the sound output device converts an audio signal including, for example, reproduced sound data or acoustic data, into an analog signal, and outputs the analog signal aurally. For example, the output device 907 can form the output unit 120 illustrated in FIG. 3 or the output unit 220 illustrated in FIG. 4.

The storage device 908 is a device for data storage, formed as an exemplary storage unit of the information processing device 900. The storage device 908 is achieved by, for example, a magnetic storage-unit device, such as a HDD, a semiconductor storage device, an optical storage device, a magneto-optical storage device, or the like. The storage device 908 may include, for example, a storage medium, a recording device that records data on the storage medium, a reading device that reads the data from the storage medium, and a deleting device that deletes the data recorded on the storage medium. The storage device 908 stores, for example, a program and various types of data to be executed by the CPU 901 and various types of data acquired from outside. For example, the storage device 908 can form the storage unit 140 illustrated in FIG. 3, the storage unit 240 illustrated in FIG. 4, or the storage unit 330 illustrated in FIG. 6.

The drive 909 that is a reader-writer for storage media, is built in the information processing device 900 or is attached to the information processing device 900 externally. The drive 909 reads information recorded on a removable storage medium, such as a magnetic disk, an optical disc, a magneto-optical disc, or a semiconductor memory, loaded therein, and outputs the information to the RAM 903. Furthermore, the drive 909 can write information on the removable storage medium.

The connection port 911 that is an interface to be connected to external equipment, serves as a connection socket with the external equipment capable of performing data transmission through, for example, universal serial bus (USB) or the like.

The communication device 913 is a communication interface including, for example, a communication device for connection to a network 920, or the like. The communication device 913 is, for example, a communication card for a wired or wireless local area network (LAN), long term evolution (LTE), Bluetooth (registered trademark), wireless USB (WUSB), or the like. Furthermore, the communication device 913 may be a router for optical communication, a router for asymmetric digital subscriber line (ADSL), a modem for various types of communication, or the like. For example, the communication device 913 is capable of transmitting and receiving signals or the like with the Internet or other communication equipment, in conformity with a predetermined protocol, such as TCP/IP or the like. For example, the communication device 913 can form the communication unit 130 illustrated in FIG. 3, the communication unit 230 illustrated in FIG. 4, or the communication unit 320 illustrated in FIG. 6.

Note that the network 920 includes a wired or wireless transmission line for information to be transmitted from a device connected to the network 920. For example, the network 920 may include public lines, such as the Internet, a telephone-line network, and a satellite communication network, various local area networks (LANs) including Ethernet (registered trademark), a wide area network (WAN), and the like. Furthermore, the network 920 may include a dedicated-line network, such as an internet protocol-virtual private network (IP-VPN).

The exemplary hardware configuration enabling achievement of the function of the information processing device 900 according to the present embodiment, has been given above. Each of the constituent elements may be achieved with a general-purpose member, or may be achieved by hardware specializing in the function of the constituent element. Therefore, the hardware configuration can be appropriately changed for use, in accordance with the technological level at which the present embodiment is carried out.

Note that a computer program for achievement of each function in the information processing device 900 according to the present embodiment as described above, can be prepared so as to be implemented in, for example, a PC. Furthermore, a computer-readable recording medium storing the computer program, can be provided. Examples of the recording medium include a magnetic disk, an optical disc, a magneto-optical disc, a flash memory, and the like. Furthermore, the computer program may be distributed, for example, through a network, instead of the recording medium.

<<6. Summary>>

The embodiment of the present disclosure has been described in detail above with reference to FIGS. 1 to 28. As described above, the display device 100 according to the present embodiment recognizes a manipulation of the user wearing the display device 100 while displaying a screen including the captured image of the observation target. Particularly, the display device 100 controls the size of the observation target in the screen, on the basis of the distance between the recognition target that the user manipulates and the criterial position. The user manipulates the recognition target and changes the distance to the criterial position, so that the size of the observation target in the screen can be easily changed. In this manner, smooth control of the sense of distance to the target in the virtual space, is achieved.

Specifically, the display device 100 may enlarge the observation target in the screen as the distance between the recognition target and the criterial position lengthens, and may reduce the observation target in the screen as the distance between the recognition target and the criterial position shortens. Thus, the conjunction between the distance between the recognition target and the criterial position and the size of the observation target in the screen, enables the user to control the sense of distance to the target in the virtual space, intuitively.

Furthermore, the recognition target may be a hand of the user with fingers forming a ring. This arrangement enables the user to control the sense of distance to the target in the virtual space, with a simple hand gesture.

Furthermore, in a case where the predetermined manipulation to the predetermined region of the observation target is recognized, the output device 200 can output the tactile information imitating the tactile sensation acquired at the touch of the observation target. This arrangement enables the user to enjoy user experience with realistic feeling as if the user has come close to and touched the observation target even when apart from the observation target.

The preferred embodiment of the present disclosure has been described in detail above with reference to the attached drawings, but the technical scope of the present disclosure is not limited to the examples. It is obvious that a person skilled in the technical field of the present disclosure can conceive various alterations or modifications in the scope of the technical idea described in the claims, and thus it is understood that these rightfully belong to the technical scope of the present disclosure.

For example, according to the embodiment, the observation target is an animal in the zoo, but the present technology is not limited to the example. For example, the observation target may be an artist in a concert venue or may be an actor in a theatrical stage.

For example, according to the embodiment, the display device 100 that displays a screen including the captured image captured in real time by the observation device 300, has been described, but the present technology is not limited to the example. For example, the display device 100 may display content, such as a movie or a game, and the user may control the display magnification of the content with the hand gesture described above.

Note that each device described in the present specification may be achieved as an independent device, or part or all may be each achieved as a separate device. For example, in the exemplary functional configuration of the display device 100 illustrated in FIG. 3, the storage unit 140 and the control unit 150 may be included in an information processing device, such as a server, connected to the sensor unit 110 and the output unit 120 through, for example, a network. In that case, the server receives the observation information from the observation device 300, receives the sensing information from each of the output device 200 and the display device, and generates display control information for generation of a screen, such as the observation screen, and the tactile information, on the basis of the received information. Then, the server transmits the display control information to the display device to cause the output unit 120 to output the display control information, and transmits the tactile information to the output device 200 for output. A similar manner is made for the output device 200 and the observation device 300.

Furthermore, the processing described with the sequence diagram in the present specification, is not necessarily performed in the illustrated order. Some processing steps may be performed in parallel. Furthermore, an additional processing step may be adopted, and part of the processing steps may be omitted.

Furthermore, the effects described in the present specification are just explanatory or exemplary, and thus are not limitative. That is, the technology according to the present disclosure has other effects obvious to a person skilled in the art, from the descriptions in the present specification, in addition to the effects or instead of the effects.

Note that the following configurations belong to the technical scope of the present disclosure.

(1)

An information processing device including:

a recognition unit configured to recognize a manipulation of a user wearing a display device; and an output control unit configured to control, while causing the display device to display a screen including a captured image of an observation target, a size of the observation target in the screen, on the basis of a distance between a recognition target that the user manipulates and a criterial position.

(2)

The information processing device described in (1) above, in which the output control unit enlarges the observation target in the screen as the distance between the recognition target and the criterial position lengthens, and reduces the observation target in the screen as the distance between the recognition target and the criterial position shortens.

(3)

The information processing device described in (1) or (2) above, in which the distance between the recognition target and the criterial position is a distance in a criterial direction between the criterial position and the recognition target, and the output control unit controls, on the basis of a position of the recognition target in a direction orthogonal to the criterial direction, a central position of the control of the size of the observation target in the screen.

(4)
The information processing device described in (3) above, in which the output control unit displays information indicating the central position.

(5)
The information processing device described in any one of (1) to (4) above, in which the criterial position is a position of the display device worn on the user.

(6)
The information processing device described in any one of (1) to (5) above, in which the recognition target is a hand of the user in a predetermined shape.

(7)
The information processing device described in (6) above, in which the recognition target is the hand of the user with fingers forming a ring, and the output control unit further controls the size of the observation target in the screen, on the basis of an attitude of the ring.

(8)
The information processing device described in any one of (1) to (7) above, in which the output control unit controls imaging magnification of the captured image, so as to control the size of the observation target in the screen.

(9)
The information processing device described in any one of (1) to (8), in which the output control unit causes, in a case where a predetermined manipulation to a predetermined region of the observation target is recognized, an output device to output tactile information imitating a tactile sensation acquired at a touch of the observation target.

(10)
The information processing device described in (9) above, in which the output control unit causes an image indicating a hand of the user who performs the predetermined manipulation to the observation target, to be displayed in superimposition on the observation target.

(11)
The information processing device described in (9) or (10) above, in which the observation target is an animal, and the tactile information includes at least any of heartbeat, body temperature, or a feel of a body surface of the observation target.

(12)
The information processing device described in any one of (9) to (11) above, in which the output control unit causes information indicating that the predetermined manipulation is allowed, to be displayed in association with the predetermined region.

(13)
The information processing device described in (12) above, in which the output control unit controls a degree of detail of the information indicating that the predetermined manipulation is allowed, on the basis of the size of the observation target in the screen.

(14)
The information processing device described in any one of (9) to (13) above, in which the output device is worn on a hand of the user, and includes at least any of a vibration generation device, a thermal generation device, or a feel generation device.

(15)
The information processing device described in any one of (1) to (14) above, in which the output control unit causes display of a screen including a plurality of display objects corresponding to a plurality of candidate image capturing devices that is likely to be a source of provision of the captured image to be displayed by the display device, and the recognition unit recognizes a predetermined manipulation of the user to one display object of the plurality of display objects displayed, as a selection manipulation to the candidate image capturing device.

(16)
The information processing device described in (15) above, in which the output control unit causes the display objects corresponding to the candidate image capturing devices, to be displayed at positions corresponding to installed positions of the candidate image capturing devices in the screen.

(17)
The information processing device described in (15) above, in which the output control unit causes the display objects each including a captured image captured by the candidate image capturing device, to be displayed in arrangement at heights corresponding to angles of capturing directions of the candidate image capturing devices to a vertical direction.

(18)
The information processing device described in any one of (1) to (17) above, in which the display device includes: a first image sensor configured to capture an eye of the user; and a second image sensor configured to capture the recognition target.

(19)
An information processing method to be performed by a processor, the information processing method including:
recognizing a manipulation of a user wearing a display device; and
controlling, while causing the display device to display a screen including a captured image of an observation target, a size of the observation target in the screen, on the basis of a distance between a recognition target that the user manipulates and a criterial position.

(20)
A recording medium storing a program for causing a computer to function as:
a recognition unit configured to recognize a manipulation of a user wearing a display device; and
an output control unit configured to control, while causing the display device to display a screen including a captured image of an observation target, a size of the observation target in the screen, on the basis of a distance between a recognition target that the user manipulates and a criterial position.

REFERENCE SIGNS LIST

1 System
10 Fence
100 Display device
110 Sensor unit
111 Inward camera
112 Outward camera
120 Output unit
121 Display unit
130 Communication unit
140 Storage unit 150 Control unit
151 Recognition unit
153 Output control unit
200 Output device
210 Sensor unit
220 Output unit
230 Communication unit
240 Storage unit
250 Control unit
300 Observation device
310 Sensor unit
320 Communication unit
330 Storage unit
340 Control unit
700 Recognition target

The invention claimed is:

1. An information processing device, comprising:
a recognition unit configured to recognize a first manipulation of a user; and
an output control unit configured to:
control a display device to display a screen including a captured image of an observation target and at least one annotation corresponding to the observation target, wherein
the at least one annotation indicates allowance of the first manipulation to a specific region of the observation target, and
the display device is wearable by the user;
control a size of the observation target in the screen based on a distance between a recognition target and a criterial position, wherein the recognition target is manipulated by the user;
change content of the at least one annotation in the screen based on a change in the size of the observation target in the screen, wherein the at least one annotation in the screen is different from the observation target in the screen; and
change at least one of the content of the at least one annotation or a shape of the at least one annotation in the screen based on emotion of the observation target, wherein the emotion of the observation target is based on the captured image of the observation target.

2. The information processing device according to claim 1, wherein the output control unit is further configured to:
enlarge the size of the observation target in the screen based on an increase in the distance between the recognition target and the criterial position; and
reduce the size of the observation target in the screen based on a decrease in the distance between the recognition target and the criterial position.

3. The information processing device according to claim 1, wherein
the distance between the recognition target and the criterial position is a distance in a criterial direction between the criterial position and the recognition target, and
the output control unit is further configured to control, based on a position of the recognition target in a direction orthogonal to the criterial direction, a central position of the control of the size of the observation target in the screen.

4. The information processing device according to claim 3, wherein the output control unit is further configured to control the display device to display information indicating the central position.

5. The information processing device according to claim 1, wherein the criterial position is a position of the display device.

6. The information processing device according to claim 1, wherein the recognition target is a hand of the user in a specific shape.

7. The information processing device according to claim 6, wherein
the recognition target is the hand of the user with fingers forming a ring, and
the output control unit is further configured to control the size of the observation target in the screen based on an angle of the ring to a vertical direction.

8. The information processing device according to claim 1, wherein the output control unit is further configured to:
control imaging magnification of the captured image; and
control the size of the observation target in the screen based on the imaging magnification.

9. The information processing device according to claim 1, wherein the output control unit is further configured to:
recognize the first manipulation to the specific region of the observation target; and
control an output device to output tactile information based on the recognized first manipulation to the specific region of the observation target, wherein the output tactile information imitates a tactile sensation acquired at a touch of the observation target.

10. The information processing device according to claim 9, wherein
the output control unit is further configured to control display of an image indicating a hand of the user in a superimposition position on the observation target in the screen, and
the hand of the user is superimposed on the observation target in the screen based on the recognized first manipulation to the specific region of the observation target.

11. The information processing device according to claim 9, wherein
the observation target is an animal, and
the tactile information includes at least one of heartbeat, body temperature, or a feel of a body surface of the observation target.

12. The information processing device according to claim 9, wherein the output control unit is further configured to control the display of the at least one annotation indicating the allowance of the first manipulation to the specific region in association with the specific region.

13. The information processing device according to claim 9, wherein
the output device is wearable on a hand of the user, and
the output device includes at least one of a vibration generation device, a thermal generation device, or a feel generation device.

14. The information processing device according to claim 1, wherein
the output control unit is further configured to control the display device to display a plurality of display objects,
each display object of the plurality of display objects corresponds to a respective candidate image capturing device of a plurality of candidate image capturing devices,
at least one candidate image capturing device of the plurality of candidate image capturing devices is a source of provision of the captured image, and
the recognition unit is further configured to recognize, as a selection manipulation to the at least one candidate image capturing device, a second manipulation to a display object of the plurality of display objects.

15. The information processing device according to claim 14, wherein
the output control unit is further configured to control display of each display object of the plurality of display objects at a position corresponding to installed position of the respective candidate image capturing device in the screen.

16. The information processing device according to claim 14, wherein
the output control unit is further configured to control display of each display object of the plurality of display objects in an arrangement at a height corresponding to an angle of a capturing direction of the respective candidate image capturing device to a vertical direction, and
each display object of the plurality of display objects includes an image captured by the respective candidate image capturing device of the plurality of candidate image capturing devices.

17. The information processing device according to claim 1, wherein the display device includes:
a first image sensor configured to capture an eye of the user; and
a second image sensor configured to capture the recognition target.

18. An information processing method, comprising:
in an information processing device:
recognizing, by a processor, a manipulation of a user;
controlling, by the processor, a display device to display a screen including a captured image of an observation target and at least one annotation corresponding to the observation target, wherein
the at least one annotation indicates allowance of the manipulation to a specific region of the observation target, and
the display device is wearable by the user;
controlling, by the processor, a size of the observation target in the screen based on a distance between a recognition target and a criterial position, wherein the recognition target is manipulated by the user;
changing, by the processor, content of the at least one annotation in the screen based on a change in the size of the observation target in the screen, wherein the at least one annotation in the screen is different from the observation target in the screen; and
changing, by the processor, at least one of the content of the at least one annotation or a shape of the at least one annotation in the screen based on emotion of the observation target, wherein the emotion of the observation target is based on the captured image of the observation target.

19. A non-transitory computer-readable medium having stored thereon computer-executable instructions which, when executed by a processor, cause the processor to execute operations, the operations comprising:
recognizing a manipulation of a user; and
controlling a display device to display a screen including a captured image of an observation target and at least one annotation corresponding to the observation target, wherein
the at least one annotation indicates allowance of the manipulation to a specific region of the observation target, and
the display device is wearable by the user;
controlling a size of the observation target in the screen based on a distance between a recognition target and a criterial position, wherein the recognition target is manipulated by the user;
changing content of the at least one annotation in the screen based on a change in the size of the observation target in the screen, wherein the at least one annotation in the screen is different from the observation target in the screen; and
changing at least one of the content of the at least one annotation or a shape of the at least one annotation in the screen based on emotion of the observation target, wherein the emotion of the observation target is based on the captured image of the observation target.

20. An information processing device, comprising:
a recognition unit configured to recognize a manipulation of a user; and
an output control unit configured to:
control a display device to display a screen including a captured image of an observation target and at least one annotation corresponding to the observation target, wherein
the at least one annotation indicates allowance of the manipulation to a specific region of the observation target, and
the display device is wearable by the user;
control a size of the observation target in the screen based on
a distance between a hand of the user and a criterial position, and
an angle of a ring, formed by fingers of the hand, to a vertical direction;
control content of the at least one annotation based on the size of the observation target in the screen; and
control at least one of the content of the at least one annotation, a shape of the at least one annotation, or a display position of the at least one annotation based on emotion of the observation target, wherein
the emotion of the observation target is based on the captured image of the observation target.

* * * * *